(12) United States Patent
Davis et al.

(10) Patent No.: US 9,465,771 B2
(45) Date of Patent: Oct. 11, 2016

(54) SERVER ON A CHIP AND NODE CARDS COMPRISING ONE OR MORE OF SAME

(71) Applicant: III HOLDINGS 2, LLC, Wilmington, DE (US)

(72) Inventors: Mark Bradley Davis, Austin, TX (US); David James Borland, Austin, TX (US); Arnold Thomas Schnell, Pflugerville, TX (US)

(73) Assignee: III HOLDINGS 2, LLC, Wilmington, DE (US)

( * ) Notice: Subject to any disclaimer, the term of this patent is extended or adjusted under 35 U.S.C. 154(b) by 358 days.

(21) Appl. No.: 13/662,759

(22) Filed: Oct. 29, 2012

(65) Prior Publication Data

US 2014/0122833 A1 May 1, 2014
US 2016/0154760 A9 Jun. 2, 2016

Related U.S. Application Data

(63) Continuation-in-part of application No. 12/794,996, filed on Jun. 7, 2010, now abandoned, and a continuation-in-part of application No. 12/889,721, filed on Sep. 24, 2010, application No. 13/622,759, (Continued)

(51) Int. Cl.
*G06F 1/32* (2006.01)
*G06F 15/78* (2006.01)

(52) U.S. Cl.
CPC ....... *G06F 15/7807* (2013.01); *G06F 15/7803* (2013.01); *Y02B 60/1207* (2013.01); *Y02B 60/1225* (2013.01)

(58) Field of Classification Search
None
See application file for complete search history.

(56) References Cited

U.S. PATENT DOCUMENTS

| 5,451,936 A | 9/1995 | Yang et al. |
| 5,594,908 A | 1/1997 | Hyatt |
| 5,623,641 A | 4/1997 | Kadoyashiki |
| 5,781,187 A | 7/1998 | Gephardt et al. |
| 5,901,048 A | 5/1999 | Hu |
| 5,908,468 A | 6/1999 | Hartmann |

(Continued)

FOREIGN PATENT DOCUMENTS

| JP | 2005-223753 | 8/2005 |
| JP | 2005-536960 | 12/2005 |

(Continued)

OTHER PUBLICATIONS

Advanced Switching Technology Tech Brief, published 2005, 2 pages.

(Continued)

*Primary Examiner* — Paul Yanchus, III

(57) ABSTRACT

A server on a chip that can be a component of a node card. The server on a chip can include a node central processing unit subsystem, a peripheral subsystem, a system interconnect subsystem, and a management subsystem. The central processing unit subsystem can include a plurality of processing cores each running an independent instance of an operating system. The peripheral subsystem includes a plurality of interfaces for various configurations of storage media. The system interconnect subsystem provides for intra-node and inter-node packet connectivity. The management subsystem provides for various system and power management functionalities within the subsystems of the server on a chip.

22 Claims, 15 Drawing Sheets

Related U.S. Application Data which is a continuation-in-part of application No. 12/234,054, filed on Sep. 15, 2011, which is a continuation-in-part of application No. 12/794,996, filed on Jun. 7, 2010, now abandoned, application No. 13/662,759, which is a continuation-in-part of application No. 13/284,855, filed on Oct. 28, 2011, now abandoned, and a continuation-in-part of application No. 13/453,086, filed on Apr. 23, 2012, now Pat. No. 8,599,863, application No. 13/622,759, which is a continuation-in-part of application No. 13/475,722, filed on May 18, 2012, now Pat. No. 9,077,654, which is a continuation-in-part of application No. 12/794,996, filed on Jun. 7, 2010, now abandoned, application No. 13/662,759, which is a continuation-in-part of application No. 13/475,713, filed on May 18, 2012, now Pat. No. 9,054,990, which is a continuation-in-part of application No. 12/794,996, filed on Jun. 7, 2010, now abandoned, application No. 13/662,759, which is a continuation-in-part of application No. 13/527,498, filed on Jun. 19, 2012, now Pat. No. 9,069,929.

(60) Provisional application No. 61/256,723, filed on Oct. 30, 2009, provisional application No. 61/245,592, filed on Sep. 24, 2009, provisional application No. 61/383,585, filed on Sep. 16, 2010, provisional application No. 61/489,569, filed on May 24, 2011, provisional application No. 61/553,555, filed on Oct. 31, 2011.

(56) References Cited

U.S. PATENT DOCUMENTS

| | | |
|---|---|---|
| 5,968,176 A | 10/1999 | Nessett et al. |
| 5,971,804 A | 10/1999 | Gallagher et al. |
| 6,055,618 A | 4/2000 | Thorson |
| 6,141,214 A | 10/2000 | Ahn |
| 6,181,699 B1 | 1/2001 | Crinion et al. |
| 6,192,414 B1 | 2/2001 | Horn |
| 6,198,741 B1 | 3/2001 | Yoshizawa et al. |
| 6,314,487 B1 | 11/2001 | Hahn et al. |
| 6,314,501 B1 | 11/2001 | Gulick et al. |
| 6,373,841 B1 | 4/2002 | Goh et al. |
| 6,442,137 B1 | 8/2002 | Yu et al. |
| 6,446,192 B1 | 9/2002 | Narasimhan et al. |
| 6,452,809 B1 | 9/2002 | Jackson et al. |
| 6,507,586 B1 | 1/2003 | Satran et al. |
| 6,556,952 B1 | 4/2003 | Magro |
| 6,574,238 B1 | 6/2003 | Thrysoe |
| 6,711,691 B1 | 3/2004 | Howard et al. |
| 6,766,389 B2 | 7/2004 | Hayter et al. |
| 6,813,676 B1 | 11/2004 | Henry et al. |
| 6,816,750 B1 | 11/2004 | Klaas |
| 6,842,430 B1 | 1/2005 | Melnik |
| 6,857,026 B1 | 2/2005 | Cain |
| 6,963,926 B1 | 11/2005 | Robinson |
| 6,963,948 B1 | 11/2005 | Gulick |
| 6,977,939 B2 | 12/2005 | Joy et al. |
| 6,988,170 B2 | 1/2006 | Barroso et al. |
| 6,990,063 B1 | 1/2006 | Lenoski et al. |
| 7,020,695 B1 | 3/2006 | Kundu et al. |
| 7,032,119 B2 | 4/2006 | Fung |
| 7,080,078 B1 | 7/2006 | Slaughter et al. |
| 7,080,283 B1 | 7/2006 | Songer et al. |
| 7,095,738 B1 | 8/2006 | Desanti |
| 7,119,591 B1 | 10/2006 | Lin |
| 7,143,153 B1 | 11/2006 | Black et al. |
| 7,165,120 B1 | 1/2007 | Giles et al. |
| 7,170,315 B2 | 1/2007 | Bakker et al. |
| 7,180,866 B1 | 2/2007 | Chartre et al. |
| 7,203,063 B2 | 4/2007 | Bash et al. |
| 7,257,655 B1 | 8/2007 | Burney et al. |
| 7,263,288 B1 | 8/2007 | Islam |
| 7,274,705 B2 | 9/2007 | Chang et al. |
| 7,278,582 B1 | 10/2007 | Siegel et al. |
| 7,310,319 B2 | 12/2007 | Awsienko et al. |
| 7,325,050 B2 | 1/2008 | O'Connor et al. |
| 7,337,333 B2 | 2/2008 | O'Conner et al. |
| 7,340,777 B1 | 3/2008 | Szor |
| 7,353,362 B2 | 4/2008 | Georgiou et al. |
| 7,382,154 B2 | 6/2008 | Ramos et al. |
| 7,386,888 B2 | 6/2008 | Liang et al. |
| 7,418,534 B2 | 8/2008 | Hayter et al. |
| 7,437,540 B2 | 10/2008 | Paolucci et al. |
| 7,447,147 B2 | 11/2008 | Nguyen et al. |
| 7,447,197 B2 | 11/2008 | Terrell et al. |
| 7,466,712 B2 | 12/2008 | Makishima et al. |
| 7,467,306 B2 | 12/2008 | Cartes et al. |
| 7,467,358 B2 | 12/2008 | Kang et al. |
| 7,502,884 B1 | 3/2009 | Shah et al. |
| 7,519,843 B1 | 4/2009 | Buterbaugh et al. |
| 7,555,666 B2 | 6/2009 | Brundridge et al. |
| 7,583,661 B2 | 9/2009 | Chaudhuri |
| 7,586,841 B2 | 9/2009 | Vasseur |
| 7,596,144 B2 | 9/2009 | Pong |
| 7,599,360 B2 | 10/2009 | Edsall et al. |
| 7,606,225 B2 | 10/2009 | Xie et al. |
| 7,606,245 B2 | 10/2009 | Ma et al. |
| 7,616,646 B1 | 11/2009 | Ma et al. |
| 7,620,057 B1 | 11/2009 | Aloni et al. |
| 7,657,677 B2 | 2/2010 | Huang et al. |
| 7,657,756 B2 | 2/2010 | Hall |
| 7,660,922 B2 | 2/2010 | Harriman |
| 7,664,110 B1 | 2/2010 | Lovett et al. |
| 7,673,164 B1 | 3/2010 | Agarwal |
| 7,710,936 B2 | 5/2010 | Morales Barroso |
| 7,719,834 B2 | 5/2010 | Miyamoto et al. |
| 7,721,125 B2 | 5/2010 | Fung |
| 7,751,433 B2 | 7/2010 | Dollo et al. |
| 7,760,720 B2 | 7/2010 | Pullela et al. |
| 7,761,687 B2 | 7/2010 | Blumrich et al. |
| 7,783,910 B2 | 8/2010 | Felter et al. |
| 7,791,894 B2 | 9/2010 | Bechtolsheim |
| 7,792,113 B1 | 9/2010 | Foschiano et al. |
| 7,796,399 B2 | 9/2010 | Clayton et al. |
| 7,801,132 B2 | 9/2010 | Ofek et al. |
| 7,802,017 B2 | 9/2010 | Uemura et al. |
| 7,805,575 B1 | 9/2010 | Agarwal et al. |
| 7,831,839 B2 | 11/2010 | Hatakeyama |
| 7,840,703 B2 | 11/2010 | Arimilli et al. |
| 7,865,614 B2 | 1/2011 | Lu et al. |
| 7,925,795 B2 | 4/2011 | Tamir et al. |
| 7,934,005 B2 | 4/2011 | Fascenda |
| 7,970,929 B1 | 6/2011 | Mahalingaiah |
| 7,975,110 B1 | 7/2011 | Spaur et al. |
| 7,991,817 B2 | 8/2011 | Dehon et al. |
| 7,991,922 B2 | 8/2011 | Hayter et al. |
| 7,992,151 B2 | 8/2011 | Warrier et al. |
| 8,019,832 B2 | 9/2011 | De Sousa et al. |
| 8,060,760 B2 | 11/2011 | Shetty et al. |
| 8,060,775 B1 | 11/2011 | Sharma et al. |
| 8,082,400 B1 | 12/2011 | Chang et al. |
| 8,108,508 B1 | 1/2012 | Goh et al. |
| 8,122,269 B2 | 2/2012 | Houlihan et al. |
| 8,132,034 B2 | 3/2012 | Lambert et al. |
| 8,155,113 B1 | 4/2012 | Agarwal |
| 8,156,362 B2 | 4/2012 | Branover et al. |
| 8,165,120 B2 | 4/2012 | Maruccia et al. |
| 8,170,040 B2 | 5/2012 | Konda |
| 8,180,996 B2 | 5/2012 | Fullerton et al. |
| 8,189,612 B2 | 5/2012 | Lemaire et al. |
| 8,194,659 B2 | 6/2012 | Ban |
| 8,199,636 B1 | 6/2012 | Rouyer et al. |
| 8,205,103 B2 | 6/2012 | Kazama et al. |
| 8,379,425 B2 | 2/2013 | Fukuoka et al. |
| 8,397,092 B2 | 3/2013 | Karnowski |
| 8,407,428 B2 | 3/2013 | Cheriton et al. |
| 8,504,791 B2 | 8/2013 | Cheriton et al. |
| RE44,610 E | 11/2013 | Krakirian et al. |

(56) References Cited

U.S. PATENT DOCUMENTS

| | | |
|---|---|---|
| 8,599,863 B2 | 12/2013 | Davis |
| 8,684,802 B1 | 4/2014 | Gross et al. |
| 8,738,860 B1 | 5/2014 | Griffin et al. |
| 8,745,275 B2 | 6/2014 | Ikeya et al. |
| 8,745,302 B2 | 6/2014 | Davis et al. |
| 8,782,321 B2 | 7/2014 | Harriman et al. |
| 8,812,400 B2 | 8/2014 | Faraboschi et al. |
| 8,824,485 B2 | 9/2014 | Biswas et al. |
| 8,854,831 B2 | 10/2014 | Arnouse |
| 8,903,964 B2 | 12/2014 | Breslin |
| 9,008,079 B2 | 4/2015 | Davis et al. |
| 2001/0046227 A1 | 11/2001 | Matsuhira et al. |
| 2002/0004912 A1 | 1/2002 | Fung |
| 2002/0040391 A1 | 4/2002 | Chaiken et al. |
| 2002/0083352 A1 | 6/2002 | Fujimoto et al. |
| 2002/0097732 A1 | 7/2002 | Worster et al. |
| 2002/0107903 A1 | 8/2002 | Richter et al. |
| 2002/0124128 A1 | 9/2002 | Qiu |
| 2002/0159452 A1 | 10/2002 | Foster et al. |
| 2002/0161917 A1 | 10/2002 | Shapiro et al. |
| 2002/0172205 A1 | 11/2002 | Tagore-Brage et al. |
| 2002/0186656 A1 | 12/2002 | Vu |
| 2002/0194412 A1 | 12/2002 | Bottom |
| 2003/0007493 A1 | 1/2003 | Oi et al. |
| 2003/0033547 A1 | 2/2003 | Larson et al. |
| 2003/0041266 A1 | 2/2003 | Ke et al. |
| 2003/0076832 A1 | 4/2003 | Ni |
| 2003/0093255 A1 | 5/2003 | Freyensee et al. |
| 2003/0093624 A1 | 5/2003 | Arimilli et al. |
| 2003/0110262 A1 | 6/2003 | Hasan et al. |
| 2003/0140190 A1 | 7/2003 | Mahony et al. |
| 2003/0158940 A1 | 8/2003 | Leigh |
| 2003/0159083 A1 | 8/2003 | Fukuhara et al. |
| 2003/0172191 A1 | 9/2003 | Williams |
| 2003/0188083 A1* | 10/2003 | Kumar .................... G06F 1/04 710/315 |
| 2003/0193402 A1 | 10/2003 | Post et al. |
| 2003/0202520 A1 | 10/2003 | Witkowski et al. |
| 2003/0231624 A1 | 12/2003 | Alappat et al. |
| 2004/0013113 A1 | 1/2004 | Singh et al. |
| 2004/0017806 A1 | 1/2004 | Yazdy et al. |
| 2004/0017808 A1 | 1/2004 | Forbes et al. |
| 2004/0030938 A1 | 2/2004 | Barr et al. |
| 2004/0068676 A1 | 4/2004 | Larson et al. |
| 2004/0111612 A1 | 6/2004 | Choi et al. |
| 2004/0141521 A1 | 7/2004 | George |
| 2004/0165588 A1 | 8/2004 | Pandya |
| 2004/0210693 A1 | 10/2004 | Zeitler et al. |
| 2004/0215864 A1 | 10/2004 | Arimilli et al. |
| 2004/0215991 A1 | 10/2004 | McAfee et al. |
| 2004/0267486 A1 | 12/2004 | Percer et al. |
| 2005/0015378 A1 | 1/2005 | Gammel et al. |
| 2005/0018604 A1 | 1/2005 | Dropps et al. |
| 2005/0018606 A1 | 1/2005 | Dropps et al. |
| 2005/0018663 A1 | 1/2005 | Dropps et al. |
| 2005/0021606 A1 | 1/2005 | Davies et al. |
| 2005/0030954 A1 | 2/2005 | Dropps et al. |
| 2005/0033742 A1 | 2/2005 | Kamvar et al. |
| 2005/0033890 A1 | 2/2005 | Lee |
| 2005/0044195 A1 | 2/2005 | Westfall |
| 2005/0077921 A1 | 4/2005 | Percer et al. |
| 2005/0105538 A1 | 5/2005 | Perera et al. |
| 2005/0141424 A1 | 6/2005 | Lim et al. |
| 2005/0228852 A1 | 10/2005 | Santos et al. |
| 2005/0240688 A1 | 10/2005 | Moerman et al. |
| 2006/0002311 A1 | 1/2006 | Iwanaga et al. |
| 2006/0013218 A1 | 1/2006 | Shore et al. |
| 2006/0029053 A1 | 2/2006 | Roberts et al. |
| 2006/0090025 A1 | 4/2006 | Tufford et al. |
| 2006/0136570 A1 | 6/2006 | Pandya |
| 2006/0140211 A1 | 6/2006 | Huang et al. |
| 2006/0174342 A1 | 8/2006 | Zaheer et al. |
| 2006/0179241 A1 | 8/2006 | Clark et al. |
| 2006/0236371 A1 | 10/2006 | Fish |
| 2006/0248359 A1 | 11/2006 | Fung |
| 2006/0259734 A1 | 11/2006 | Sheu et al. |
| 2006/0265609 A1 | 11/2006 | Fung |
| 2007/0006001 A1 | 1/2007 | Isobe et al. |
| 2007/0076653 A1 | 4/2007 | Park et al. |
| 2007/0094486 A1 | 4/2007 | Moore et al. |
| 2007/0109968 A1 | 5/2007 | Hussain et al. |
| 2007/0130397 A1 | 6/2007 | Tsu |
| 2007/0174390 A1 | 7/2007 | Silvain et al. |
| 2007/0180310 A1 | 8/2007 | Johnson et al. |
| 2007/0209072 A1 | 9/2007 | Chen |
| 2007/0226795 A1 | 9/2007 | Conti et al. |
| 2007/0280230 A1 | 12/2007 | Park |
| 2007/0286009 A1 | 12/2007 | Norman |
| 2007/0288585 A1 | 12/2007 | Sekiguchi et al. |
| 2008/0013453 A1 | 1/2008 | Chiang et al. |
| 2008/0040463 A1 | 2/2008 | Brown et al. |
| 2008/0052437 A1 | 2/2008 | Loffink et al. |
| 2008/0059782 A1 | 3/2008 | Kruse et al. |
| 2008/0075089 A1 | 3/2008 | Evans et al. |
| 2008/0089358 A1 | 4/2008 | Basso et al. |
| 2008/0104264 A1 | 5/2008 | Duerk et al. |
| 2008/0140771 A1 | 6/2008 | Vass et al. |
| 2008/0140930 A1 | 6/2008 | Hotchkiss |
| 2008/0159745 A1 | 7/2008 | Segal |
| 2008/0162691 A1 | 7/2008 | Zhang et al. |
| 2008/0183882 A1 | 7/2008 | Flynn et al. |
| 2008/0186965 A1 | 8/2008 | Zheng et al. |
| 2008/0199133 A1 | 8/2008 | Takizawa et al. |
| 2008/0212273 A1 | 9/2008 | Bechtolsheim |
| 2008/0212276 A1 | 9/2008 | Bottom et al. |
| 2008/0217021 A1 | 9/2008 | Lembcke et al. |
| 2008/0222434 A1 | 9/2008 | Shimizu et al. |
| 2008/0235443 A1 | 9/2008 | Chow et al. |
| 2008/0239649 A1 | 10/2008 | Bradicich et al. |
| 2008/0243634 A1 | 10/2008 | Dworkin et al. |
| 2008/0250181 A1 | 10/2008 | Li et al. |
| 2008/0259555 A1 | 10/2008 | Bechtolsheim et al. |
| 2008/0259788 A1 | 10/2008 | Wang et al. |
| 2008/0266793 A1 | 10/2008 | Lee |
| 2008/0270599 A1 | 10/2008 | Tamir et al. |
| 2008/0288660 A1 | 11/2008 | Balasubramanian et al. |
| 2008/0288664 A1 | 11/2008 | Pettey et al. |
| 2008/0288683 A1 | 11/2008 | Ramey |
| 2008/0301794 A1 | 12/2008 | Lee |
| 2008/0313369 A1 | 12/2008 | Verdoorn et al. |
| 2008/0320161 A1 | 12/2008 | Maruccia et al. |
| 2009/0021907 A1 | 1/2009 | Mann et al. |
| 2009/0044036 A1 | 2/2009 | Merkin |
| 2009/0063443 A1 | 3/2009 | Arimilli et al. |
| 2009/0064287 A1 | 3/2009 | Bagepalli et al. |
| 2009/0080428 A1 | 3/2009 | Witkowski et al. |
| 2009/0097200 A1 | 4/2009 | Sharma et al. |
| 2009/0113130 A1 | 4/2009 | He et al. |
| 2009/0133129 A1 | 5/2009 | Jeong et al. |
| 2009/0135751 A1 | 5/2009 | Hodges et al. |
| 2009/0135835 A1 | 5/2009 | Gallatin et al. |
| 2009/0158070 A1 | 6/2009 | Gruendler |
| 2009/0172423 A1 | 7/2009 | Song et al. |
| 2009/0198958 A1 | 8/2009 | Arimilli et al. |
| 2009/0204834 A1 | 8/2009 | Hendin et al. |
| 2009/0204837 A1* | 8/2009 | Raval et al. .................. 713/330 |
| 2009/0219827 A1 | 9/2009 | Chen et al. |
| 2009/0222884 A1 | 9/2009 | Shaji et al. |
| 2009/0225751 A1 | 9/2009 | Koenck et al. |
| 2009/0235104 A1 | 9/2009 | Fung |
| 2009/0248943 A1 | 10/2009 | Jiang et al. |
| 2009/0251867 A1 | 10/2009 | Sharma et al. |
| 2009/0259863 A1 | 10/2009 | Williams et al. |
| 2009/0259864 A1 | 10/2009 | Li et al. |
| 2009/0265045 A1 | 10/2009 | Coxe, III |
| 2009/0271656 A1 | 10/2009 | Yokota et al. |
| 2009/0276666 A1 | 11/2009 | Haley et al. |
| 2009/0279518 A1 | 11/2009 | Falk et al. |
| 2009/0282274 A1 | 11/2009 | Langgood et al. |
| 2009/0282419 A1 | 11/2009 | Mejdrich et al. |
| 2009/0313390 A1 | 12/2009 | Ahuja et al. |
| 2010/0005331 A1 | 1/2010 | Somasundaram et al. |
| 2010/0008038 A1 | 1/2010 | Coglitore |
| 2010/0008365 A1 | 1/2010 | Porat |

(56) References Cited

U.S. PATENT DOCUMENTS

| | | |
|---|---|---|
| 2010/0026408 A1 | 2/2010 | Shau |
| 2010/0040053 A1 | 2/2010 | Gottumukkula et al. |
| 2010/0049822 A1 | 2/2010 | Davies et al. |
| 2010/0051391 A1 | 3/2010 | Jahkonen |
| 2010/0106987 A1 | 4/2010 | Lambert et al. |
| 2010/0118880 A1 | 5/2010 | Kunz et al. |
| 2010/0125742 A1 | 5/2010 | Ohtani |
| 2010/0125915 A1 | 5/2010 | Hall et al. |
| 2010/0138481 A1 | 6/2010 | Behrens |
| 2010/0158005 A1 | 6/2010 | Mukhopadhyay et al. |
| 2010/0161909 A1 | 6/2010 | Nation et al. |
| 2010/0165983 A1 | 7/2010 | Aybay et al. |
| 2010/0169479 A1 | 7/2010 | Jeong et al. |
| 2010/0198972 A1 | 8/2010 | Umbehocker |
| 2010/0218194 A1 | 8/2010 | Dallman et al. |
| 2010/0220732 A1 | 9/2010 | Hussain et al. |
| 2010/0250914 A1 | 9/2010 | Abdul et al. |
| 2010/0265650 A1 | 10/2010 | Chen et al. |
| 2010/0281246 A1 | 11/2010 | Bristow et al. |
| 2010/0299548 A1 | 11/2010 | Chadirchi et al. |
| 2010/0308897 A1* | 12/2010 | Evoy et al. ............... 327/530 |
| 2010/0312910 A1 | 12/2010 | Lin et al. |
| 2010/0312969 A1 | 12/2010 | Yamazaki et al. |
| 2010/0318812 A1 | 12/2010 | Auradkar et al. |
| 2011/0023104 A1 | 1/2011 | Franklin |
| 2011/0026397 A1 | 2/2011 | Saltsidis et al. |
| 2011/0029652 A1 | 2/2011 | Chhuor et al. |
| 2011/0058573 A1 | 3/2011 | Balakavi et al. |
| 2011/0075369 A1 | 3/2011 | Sun et al. |
| 2011/0090633 A1 | 4/2011 | Rabinovitz |
| 2011/0103391 A1 | 5/2011 | Davis et al. |
| 2011/0113115 A1 | 5/2011 | Chang et al. |
| 2011/0119344 A1 | 5/2011 | Eustis |
| 2011/0123014 A1 | 5/2011 | Smith |
| 2011/0138046 A1 | 6/2011 | Bonnier et al. |
| 2011/0185370 A1 | 7/2011 | Tamir et al. |
| 2011/0191514 A1 | 8/2011 | Wu et al. |
| 2011/0191610 A1 | 8/2011 | Agarwal et al. |
| 2011/0197012 A1 | 8/2011 | Liao et al. |
| 2011/0210975 A1 | 9/2011 | Wong et al. |
| 2011/0239014 A1 | 9/2011 | Karnowski |
| 2011/0271159 A1 | 11/2011 | Ahn et al. |
| 2011/0273840 A1 | 11/2011 | Chen |
| 2011/0295991 A1 | 12/2011 | Aida |
| 2011/0296141 A1 | 12/2011 | Daffron |
| 2011/0320690 A1 | 12/2011 | Petersen et al. |
| 2012/0011500 A1 | 1/2012 | Faraboschi et al. |
| 2012/0020207 A1 | 1/2012 | Corti et al. |
| 2012/0050981 A1 | 3/2012 | Xu et al. |
| 2012/0054469 A1 | 3/2012 | Ikeya et al. |
| 2012/0054511 A1* | 3/2012 | Brinks ............... G06F 1/26 713/310 |
| 2012/0081850 A1 | 4/2012 | Regimbal et al. |
| 2012/0096211 A1 | 4/2012 | Davis et al. |
| 2012/0099265 A1 | 4/2012 | Reber |
| 2012/0131201 A1 | 5/2012 | Matthews et al. |
| 2012/0155168 A1 | 6/2012 | Kim et al. |
| 2012/0198252 A1 | 8/2012 | Kirschtein et al. |
| 2012/0207165 A1 | 8/2012 | Davis |
| 2012/0297042 A1 | 11/2012 | Davis et al. |
| 2013/0010639 A1 | 1/2013 | Armstrong et al. |
| 2013/0024645 A1 | 1/2013 | Cheriton et al. |
| 2013/0031331 A1 | 1/2013 | Cheriton et al. |
| 2013/0058250 A1 | 3/2013 | Casado et al. |
| 2013/0094499 A1 | 4/2013 | Davis et al. |
| 2013/0097448 A1 | 4/2013 | Davis et al. |
| 2013/0111107 A1 | 5/2013 | Chang et al. |
| 2013/0148667 A1 | 6/2013 | Hama et al. |
| 2013/0163605 A1 | 6/2013 | Chandra et al. |
| 2013/0290643 A1 | 10/2013 | Lim et al. |
| 2013/0290650 A1 | 10/2013 | Chang et al. |
| 2013/0318269 A1 | 11/2013 | Dalal et al. |
| 2014/0122833 A1 | 5/2014 | Davis et al. |
| 2014/0359044 A1 | 12/2014 | Davis et al. |
| 2014/0365596 A1 | 12/2014 | Kanevsky et al. |
| 2015/0039840 A1 | 2/2015 | Chandra et al. |
| 2015/0103826 A1 | 4/2015 | Davis |

FOREIGN PATENT DOCUMENTS

| | | |
|---|---|---|
| TW | M377621 | 4/2010 |
| TW | 201017430 | 5/2010 |
| WO | WO-2004/021641 | 3/2004 |
| WO | WO-2005/013143 | 2/2005 |
| WO | WO-2008/000193 | 1/2008 |
| WO | WO-2011/044271 | 4/2011 |
| WO | WO-2012/037494 | 3/2012 |

OTHER PUBLICATIONS

Chapter 1 Overview of the Origin Family Architecture from Origin and Onyx2 Theory of Operations Manual, published 1997, 18 pages.

Cisco MDS 9000 Family Multiprotocol Services Module, published 2006, 13 pages.

Comparing the I2C BUS to the SMBUS, Maxim Integrated, Dec. 1, 2000, p. 1.

Deering, "IP Multicast Extensions for 4.3BSD UNIX and related Systems," Jun. 1999, 5 pages.

Extended European Search Report for EP 10827330.1, mailed Jun. 5, 2013.

Final Office Action on U.S. Appl. No. 12/889,721, mailed Apr. 17, 2014.

Final Office Action on U.S. Appl. No. 12/794,996, mailed Jun. 19, 2013.

Final Office Action on U.S. Appl. No. 13/624,725, mailed Nov. 13, 2013.

Final Office Action on U.S. Appl. No. 13/624,731, mailed Jul. 25, 2014.

Final Office Action on U.S. Appl. No. 13/705,340, mailed Aug. 2, 2013.

Final Office Action on U.S. Appl. No. 13/705,414, mailed Aug. 9, 2013.

Final Office Action on U.S. Appl. No. 13/624,731, mailed Nov. 12, 2013.

fpga4fun.com,"What is JTAG?", 2 pages, Jan. 31, 2010.

From AT to BTX: Motherboard Form Factor, Webopedia, Apr. 29, 2005, p. 1.

HP Virtual Connect Traffic Flow—Technology brief, Jan. 2012, 22 pages.

International Preliminary Report on Patentability for PCT/US2009/044200, mailed Nov. 17, 2010.

International Preliminary Report on Patentability for PCT/US2012/038986 issued on Nov. 26, 2013.

International Preliminary Report on Patentability for PCT/US2012/061747, mailed Apr. 29, 2014.

International Preliminary Report on Patentability issued on PCT/US12/62608, issued May 6, 2014.

International Search Report and Written Opinion for PCT/US12/38987, mailed Aug. 16, 2012.

International Search Report and Written Opinion for PCT/US12/61747, mailed Mar. 1, 2013.

International Search Report and Written Opinion for PCT/US12/62608, mailed Jan. 18, 2013.

International Search Report and Written Opinion for PCT/US2010/053227, mailed May 10, 2012.

International Search Report and Written Opinion for PCT/US2011/051996, mailed Jan. 19, 2012.

International Search Report and Written Opinion on PCT/US09/44200, mailed Jul. 1, 2009.

International Search Report and Written Opinion on PCT/US2012/038986, mailed Mar. 14, 2013.

Jansen et al., "SATA-IO to Develop Specification for Mini Interface Connector" Press Release Sep. 21, 2009, Serial ATA3 pages.

Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.

(56) References Cited

OTHER PUBLICATIONS

Non-Final Action on U.S. Appl. No. 13/728,362, mailed Feb. 21, 2014.
Non-Final Office Action on U.S. Appl. No. 12/889,721, mailed Jul. 2, 2013.
Non-Final Office Action on U.S. Appl. No. 13/475,722, mailed Jan. 17, 2014.
Non-Final Office Action on U.S. Appl. No. 12/794,996, mailed Sep. 17, 2012.
Non-Final Office Action on U.S. Appl. No. 12/889,721, mailed Oct. 11, 2012.
Non-Final Office Action on U.S. Appl. No. 12/889,721, mailed Sep. 29, 2014.
Non-Final Office Action on U.S. Appl. No. 13/284,855, mailed Dec. 19, 2013.
Non-Final Office Action on U.S. Appl. No. 13/453,086, mailed Mar. 12, 2013.
Non-Final Office Action on U.S. Appl. No. 13/475,713, mailed Apr. 1, 2014.
Non-Final Office Action on U.S. Appl. No. 13/527,505, mailed May 8, 2014.
Non-Final Office Action on U.S. Appl. No. 13/527,498, Mailed May 8, 2014.
Non-Final Office Action on U.S. Appl. No. 13/624,725, mailed Jan. 10, 2013.
Non-final office action on U.S. Appl. No. 13/624,731 mailed Jan. 29, 2013.
Non-Final Office Action on U.S. Appl. No. 13/692,741, mailed Sep. 4, 2014.
Non-Final Office Action on U.S. Appl. No. 13/705,286, mailed May 13, 2013.
Non-Final Office Action on U.S. Appl. No. 13/705,340, mailed Mar. 12, 2014.
Non-Final Office Action on U.S. Appl. No. 13/705,340, mailed Mar. 29, 2013.
Non-Final Office Action on U.S. Appl. No. 13/705,414, mailed Apr. 9, 2013.
Non-Final Office Action on U.S. Appl. No. 13/705,428, mailed Jul. 10, 2013.
Notice of Allowance on U.S. Appl. No. 13/453,086, mailed Jul. 18, 2013.
Notice of Allowance on U.S. Appl. No. 13/705,386, mailed Jan. 24, 2014.
Notice of Allowance on U.S. Appl. No. 13/705,414, mailed Nov. 4, 2013.
Notice of Allowance on U.S. Appl. No. 13/284,855, mailed Jul. 14, 2014.
Venaas, "IPv4 Multicast Address Space Registry," 2013, http://www.iana.org/assignments/multicast-addresses/multicast-addresses.xhtml.
Non-Final Office Action on U.S. Appl. No. 14/106,698, mailed Feb. 12, 2015.
Notice of Allowance on U.S. Appl. No. 13/475,713, mailed Feb. 5, 2015.
Reexamination Report on Japanese Application 2012-536877, mailed Jan. 22, 2015 (English Translation not available).
Communication on EP Application 10827330.1, mailed Feb. 12, 2015.
Final Office Action on U.S. Appl. No. 14/052,723, mailed Dec. 3, 2015.
Non-Final Office Action on U.S. Appl. No. 14/334,178 mailed Dec. 18, 2015.
Non-Final Office Action on U.S. Appl. No. 14/334,931 Mailed Dec. 11, 2015.
Notice of Allowance on U.S. Appl. No. 13/692,741 mailed Dec. 4, 2015.
Final Office Action on U.S. Appl. No. 13/234,054, mailed Apr. 16, 2015.
Non-Final Office Action on U.S. Appl. No. 13/624,725, mailed Apr. 23, 2015.
Non-Final Office Action on U.S. Appl. No. 14/052,723, mailed Jun. 1, 2015.
Final Office Action on U.S. Appl. No. 12/889,721, mailed May 22, 2015.
Non-Final Office Action on U.S. Appl. No. 13/728,308, mailed May 14, 2015.
Non-Final Office Action on U.S. Appl. No. 13/728,428, mailed Jun. 12, 2015.
Final Office Action on U.S. Appl. No. 14/334,931, mailed Jul. 9, 2015.
Non-Final Office Action on U.S. Appl. No. 13/692,741, mailed Jul. 1, 2015.
Non-Final Office Action on U.S. Appl. No. 13/234,054, mailed Aug. 6, 2015.
Non-Final Office Action on U.S. Appl. No. 14/106,697, mailed Aug. 17, 2015.
Office Action on Taiwan Application 101139729, mailed May 25, 2015 (English translation not available).
Final Office Action on U.S. Appl. No. 14/106,698, mailed Aug. 19, 2015.
Final Office Action on U.S. Appl. No. 13/475,713, mailed Oct. 17, 2014.
Final Office Action on U.S. Appl. No. 13/475,722, mailed Oct. 20, 2014.
Non-Final Office Action on U.S. Appl. No. 13/234,054, mailed Oct. 23, 2014.
Final Office Action on U.S. Appl. No. 14/334,178, mailed Nov. 4, 2015.
Notice of Allowance U.S. Appl. No. 13/728,308, mailed Oct. 7, 2015.
Office Action on Taiwan Application 100133390, mailed Aug. 25, 2015 (English translation not available).
Final Office Action on U.S. Appl. No. 13/527,498, mailed Nov. 17, 2014.
Final Office Action on U.S. Appl. No. 13/527,505, mailed Dec. 5, 2014.
Notice of Allowance on U.S. Appl. No. 13/705,340, mailed Dec. 3, 2014.
Elghany et al., "High Throughput High Performance NoC Switch," NORCHIP 2008, Nov. 2008, pp. 237-240.
Grecu et al., "A Scalable Communication-Centric SoC Interconnect Architecture" Proceedings 5th International Symposium on Quality Electronic Design, 2005, pp. 343, 348 (full article included).
Hossain et al., "Extended Butterfly Fat Tree Interconnection (EFTI) Architecture for Network on CHIP," 2005 IEEE Pacific Rim Conference on Communications, Computers and Signal Processing, Aug. 2005, pp. 613-616.
Non-Final Office Action on U.S. Appl. No. 14/334,931, mailed Jan. 5, 2015.
Pande et al., "Design of a Switch for Network on Chip Applications," May 25-28, 2003 Proceedings of the 2003 International Symposium on Circuits and Systems, vol. 5, pp. V217-V220.
Final Office Action on U.S. Appl. No. 13/692,741, mailed Mar. 11, 2015.
Notice of Allowance on U.S. Appl. No. 13/475,722, mailed Feb. 27, 2015.
Notice of Allowance on U.S. Appl. No. 13/527,498, mailed Feb. 23, 2015.
Notice of Allowance on U.S. Appl. No. 13/527,505, mailed Mar. 6, 2015.
Notice of Allowance on U.S. Appl. No. 13/624,731, mailed Mar. 5, 2015.
Non-Final Office Action on U.S. Appl. No. 14/725,543 mailed Apr. 7, 2016.
Notice of Allowance on U.S. Appl. No. 13/624,725, mailed Mar. 30, 2016.
Final Office Action on U.S. Appl. No. 13/234,054, mailed Jan. 26, 2016.
Final Office Action on U.S. Appl. No. 14/106,697 mailed Feb. 2, 2016.

(56) References Cited

OTHER PUBLICATIONS

Das et al., "Unifying Packet and Circuit Switched Networks," IEEE Globecom Workshops 2009, Nov. 30, 2009, pp. 1-6.
Final Office Action on U.S. Appl. No. 13/624,725 mailed Mar. 10, 2016.
Non-Final Office Action on U.S. Appl. No. 12/889,721, mailed Feb. 24, 2016.
Final Office Action on U.S. Appl. No. 13/728,428 mailed May 6, 2016.
Notice of Allowance on U.S. Appl. No. 14/334,931 mailed May 20, 2016.
Notice of Allowance on U.S. Appl. No. 14/334,178 mailed Jun. 8, 2016.
Notice of Allowance on U.S. Appl. No. 13/728,428 mailed Jul. 18, 2016.

\* cited by examiner

SERVER ON A CHIP AND NODE CARDS COMPRISING ONE OR MORE OF SAME

RELATED APPLICATION/PRIORITY CLAIMS

This continuation-in-part application claims the benefit of priority under 35 USC 120 from U.S. Non-provisional patent application Ser. No. 13/527,498 Jun. 19, 2012 and entitled "NODE CARDS FOR A SYSTEM AND METHOD FOR MODULAR COMPUTE PROVISIONING IN LARGE SCALABLE PROCESSOR INSTALLATIONS", which claims the benefit of priority under 35 USC 119(e) from U.S. Provisional Patent Application Ser. No. 61/553,555 filed on Oct. 31, 2011 and entitled "SYSTEM AND METHOD FOR MODULAR COMPUTE PROVISIONING IN LARGE SCALABLE PROCESSOR INSTALLATIONS", the entirety of both is incorporated herein by reference.

This continuation-in-part patent application is related to co-pending U.S. Non-Provisional patent application Ser. No. 13/527,505, filed on Jun. 19, 2012 and entitled "SYSTEM BOARD FOR SYSTEM AND METHOD FOR MODULAR COMPUTE PROVISIONING IN LARGE SCALABLE PROCESSOR INSTALLATIONS", which claims the benefit of priority under 35 USC 119(e) of U.S. Provisional Patent Application Ser. No. 61/553,555 filed on Oct. 31, 2011 and entitled "SYSTEM AND METHOD FOR MODULAR COMPUTE PROVISIONING IN LARGE SCALABLE PROCESSOR INSTALLATIONS", both of these applications having a common applicant herewith and being incorporated herein in their entirety by reference.

This continuation-in-part patent application claims the benefit of priority under 35 USC 120 from co-pending U.S. Non-Provisional patent application Ser. No. 12/794,996 filed Jun. 7, 2010 and entitled "SYSTEM AND METHOD FOR HIGH-PERFORMANCE, LOW-POWER DATA CENTER INTERCONNECT FABRIC", which claims the benefit of priority under 35 USC 119(e) from U.S. Provisional Patent Application Ser. No. 61/256,723 filed Oct. 30, 2009 entitled "SYSTEM AND METHOD FOR ENHANCED COMMUNICATIONS IN A MULTI-PROCESSOR SYSTEM ON A CHIP (SOC)", both of these applications having a common applicant herewith and being incorporated herein in their entirety by reference.

This continuation-in-part patent application claims the benefit of priority under 35 USC 120 from co-pending U.S. Non-Provisional patent application Ser. No. 13/234,054 filed Sep. 16, 2011 and entitled "PERFORMANCE AND POWER OPTIMIZED COMPUTER SYSTEM ARCHITECTURES AND METHODS LEVERAGING POWER OPTIMIZED TREE FABRIC INTERCONNECT", which claims priority under 35 USC 120 from U.S. Non-Provisional patent application Ser. No. 12/794,996 filed Jun. 7, 2010 and entitled "SYSTEM AND METHOD FOR HIGH-PERFORMANCE, LOW-POWER DATA CENTER INTERCONNECT FABRIC" and which claims the benefit of priority under 35 USC 119(e) from U.S. Provisional Patent Application Ser. No. 61/383,585 filed Sep. 16, 2010 entitled "PERFORMANCE AND POWER OPTIMIZED COMPUTER SYSTEM ARCHITECTURES AND METHODS LEVERAGING POWER OPTIMIZED TREE FABRIC INTERCONNECT", all of these applications having a common applicant herewith and being incorporated herein in their entirety by reference.

This continuation-in-part patent application claims the benefit of priority under 35 USC 120 from co-pending U.S. Non-Provisional patent application Ser. No. 13/284,855 filed Oct. 28, 2011 and entitled "SYSTEM AND METHOD FOR FLEXIBLE STORAGE AND NETWORKING PROVISIONING IN LARGE SCALABLE PROCESSOR INSTALLATIONS", which has a common applicant herewith and is being incorporated herein in its entirety by reference.

This continuation-in-part patent application claims the benefit of priority under 35 USC 120 from co-pending U.S. Non-Provisional patent application Ser. No. 13/475,713 filed May 18, 2012 and entitled "SYSTEM AND METHOD FOR DATA CENTER SECURITY ENHANCEMENTS LEVERAGING SERVER SOCS OR SERVER FABRICS", which claims the benefit of priority under 35 USC 119(e) from U.S. Provisional Patent Application Ser. No. 61/489,569 filed on May 24, 2011 and entitled "DATA CENTER SECURITY ENHANCEMENTS LEVERAGING SERVER SOCS OR SERVER FABRICS" and which claims priority under 35 USC 120 from U.S. Non-Provisional patent application Ser. No. 12/794,996 filed Jun. 7, 2010 and entitled "SYSTEM AND METHOD FOR HIGH-PERFORMANCE, LOW-POWER DATA CENTER INTERCONNECT FABRIC", all of these applications having a common applicant herewith and being incorporated herein in their entirety by reference.

This continuation-in-part patent application claims the benefit of priority under 35 USC 120 from co-pending U.S. Non-Provisional patent application Ser. No. 13/475,722 filed May 18, 2012 and entitled "SYSTEM AND METHOD FOR DATA CENTER SECURITY ENHANCEMENTS LEVERAGING SERVER SOCS OR SERVER FABRICS", which claims the benefit of priority under 35 USC 119(e) from U.S. Provisional Patent Application Ser. No. 61/489,569 filed on May 24, 2011 and entitled "DATA CENTER SECURITY ENHANCEMENTS LEVERAGING SERVER SOCS OR SERVER FABRICS" and which claims priority under 35 USC 120 from U.S. Non-Provisional patent application Ser. No. 12/794,996 filed Jun. 7, 2010 and entitled "SYSTEM AND METHOD FOR HIGH-PERFORMANCE, LOW-POWER DATA CENTER INTERCONNECT FABRIC", all of these applications having a common applicant herewith and being incorporated herein in their entirety by reference.

This continuation-in-part patent application claims the benefit of priority under 35 USC 120 from co-pending U.S. Non-Provisional patent application Ser. No. 12/889,721 filed Sep. 24, 2010 and entitled "SYSTEM AND METHOD FOR CLOSED LOOP PHYSICAL RESOURCE CONTROL IN LARGE, MULTIPLE-PROCESSOR INSTALLATIONS", which claims the benefit of priority under 35 USC 119(e) from U.S. Provisional Patent Application Ser. No. 61/245,592 filed on Sep. 24, 2009 and entitled "SYSTEM AND METHOD FOR CLOSED LOOP POWER SUPPLY CONTROL IN LARGE, MULTIPLE-PROCESSOR INSTALLATIONS", both of these applications having a common applicant herewith and being incorporated herein in their entirety by reference.

This continuation-in-part patent application claims the benefit of priority under 35 USC 120 from co-pending U.S. Non-Provisional patent application Ser. No. 13/453,086 filed Apr. 23, 2012 and entitled "SYSTEM AND METHOD FOR USING A MULTI-PROTOCOL FABRIC MODULE ACROSS A DISTRIBUTED SERVER INTERCONNECT FABRIC", which has a common applicant herewith and being incorporated herein in their entirety by reference.

FIELD

The disclosure relates generally to provisioning of modular compute resources within a system design and, more particularly, to a system on a chip that provides integrated CPU, peripheral, switch fabric, system management, and power management functionalities.

BACKGROUND

Server systems generally provide a fixed number of options. For example, there are usually a fixed number of CPU sockets, memory DIMM slots, PCI Express IO slots and a fixed number of hard drive bays, which often are delivered empty as they provide future upgradability. The customer is expected to gauge future needs and select a server chassis category that will serve present and future needs. Historically, and particularly with x86-class servers, predicting the future needs has been achievable because product improvements from one generation to another have been incremental.

With the advent of power optimized, scalable servers, the ability to predict future needs has become less obvious. For example, in this class of high-density, low-power servers within a 2U chassis, it is possible to install on the order of 120 compute nodes in an incremental fashion. Using this server as a data storage device, the user may require only 4 compute nodes, but may desire 80 storage drives. Using the same server as a pure compute function focused on analytics, the user may require 120 compute nodes and no storage drives. The nature of scalable servers lends itself to much more diverse applications that require diverse system configurations. As the diversity increases over time, the ability to predict the system features that must scale becomes increasingly difficult.

It is desirable to provide smaller sub-units of a computer system that are modular and can be connected to each other to form larger, highly configurable scalable servers. Thus, it is desirable to create a system and method to modularly scale compute resources in these power-optimized, high density, scalable servers.

DETAILED DESCRIPTION OF ONE OR MORE EMBODIMENTS

The disclosure is particularly applicable to examples of the node cards illustrated and described below and it is in this context that the disclosure will be described. It will be appreciated, however, that the disclosure has broader applicability since the disclosed system and node cards can be implemented in different manners that are within the scope of the disclosure and may be used for any application since all of the various applications in which the system and node cards may be used are within the scope of the disclosure.

Figure 1:
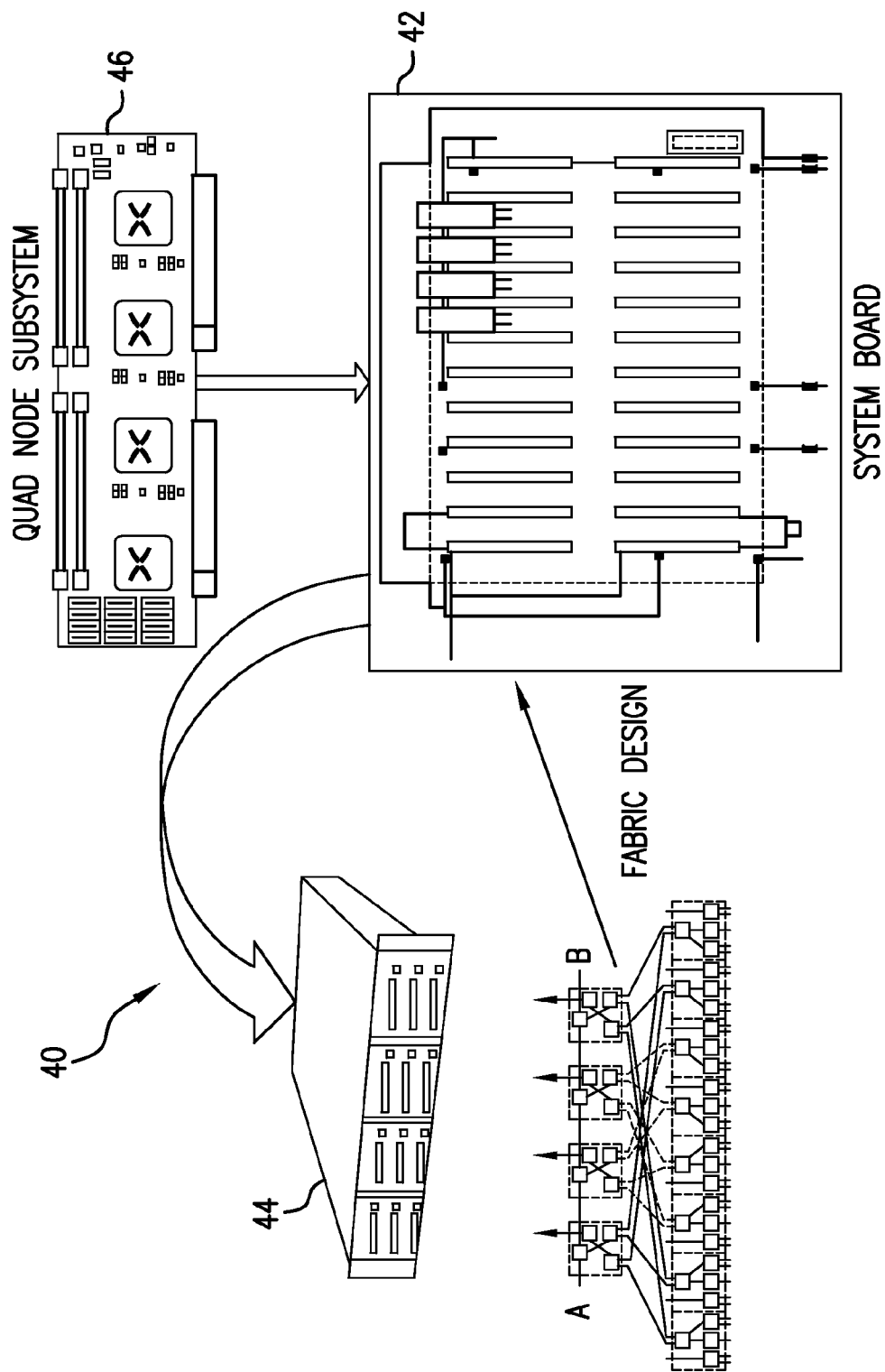
FIG. 1 illustrates an example of a system board on which one or more node cards may be installed.

FIG. 1 illustrates an example of a system 40 that may include a system board 42 on which one or more node cards 46 may be installed. The system board 42 may be fit into a typical server chassis 44 and the system board 42 may have the one or more node cards 46, such as one or more server node units (described below with reference to FIG. 2) plugged into the system board. There are a number of functions that are needed to complete a full classic server which includes Ethernet PHYs to interface the one or more ServerNodes 46 or a cluster of ServerNodes and server control functions (fan control, buttons etc. . . . ). The system board 42 is the component that ties the ServerNodes 46 to these components. The system board 42 is desirable if a hierarchical hardware partition is desired where the "building block" is smaller than the desired system, or when the "building block" is not standalone. The system board 42 roles can include: Ethernet network connectivity, internal fabric connections between ServerNodes or groups a ServerNodes in a sub-system (the fabric design in FIG. 1) and chassis control and management. The system board is the component that connects the fabric links between ServerNodes and allows them to communicate with the external world. Once the fabric design, hardware partitioning and storage decisions have been made, the system board 42 can glue the system components together and the input/output (I/O) of the system may include: management data input/output (MDIO) for SFP communication, comboPHYs for internal fabric links, storage and Ethernet access, UART and JTAG ports for debug and SMBus and GPIOs for chassis component control and communication.

Now, several different examples of node cards that may be plugged into the system board are described in more detail. These node cards leverage highly integrated SoCs designed for Server applications, that enable density and system design options that has not been available to date. Cards can be defined that have the functionality of one or more servers and these Cards can be linked together to form clusters of servers in very dense implementations. A high level description of the Card would include a highly integrated SOC implementing the server functionality, DRAM memory, support circuitry such as voltage regulation, and clocks. The input/output of the card would be power and server to server interconnect and/or server to Ethernet PHY connectivity. SATA (serial advanced technology attachment) connections can also be added to interface to drives. An example of a node card is shown in FIG. 2 with one or more system on a chip (SOC) units (i.e., SoCs).

The fabric connections on each node card 46 can be designed to balance: usage of SOC PHYs, link redundancy, link bandwidth and flexibility in usage of the 8 links at the edge connectors. A node card 46 like that shown in FIG. 3 can be used in conjunction with a system board where the system board provides power to the node cards and connections to interconnect off the system board such as an Ethernet transceiver. The system board could house one or more node cards. In the case of housing more than one node card, the system board creates a cluster of Servers that utilize a server to server interconnect or fabric that is integrated in the SOC or a separate function on the card. This system board can be made in many forms, including industry standard form factors such as ATX or in customer form factors. The system board could be a blade or could fit into a standard chassis such as a 2U or any other size.

Figure 2:
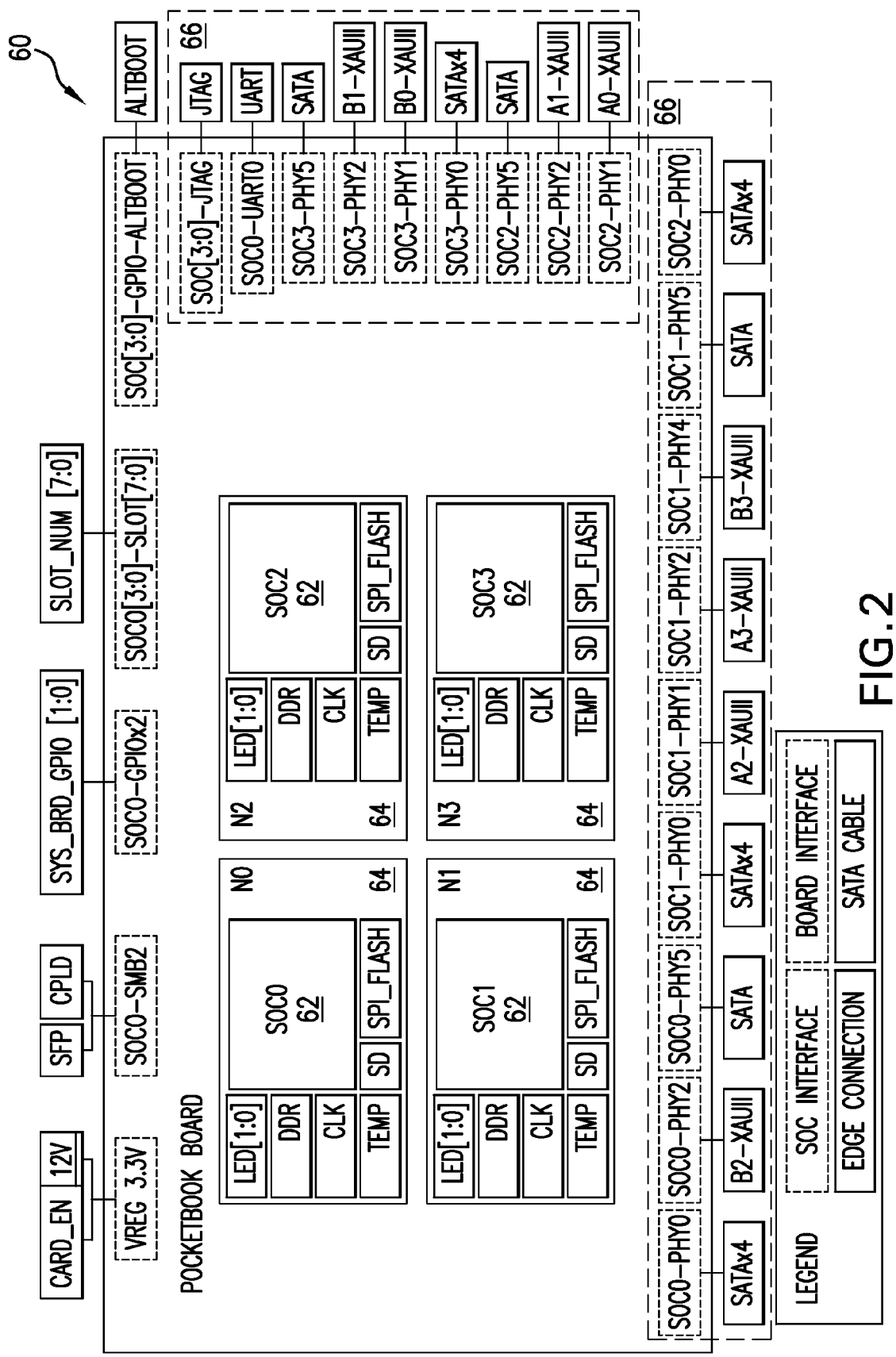
FIG. 2 illustrates an embodiment of the details of each node card.

FIG. 2 illustrates an example a node card 60. The node card may be a printed circuit board with a male physical connector, on which there is one or more servers that get power from some of the signals on the physical connector and use some of the signals on the connector for server to server communication or server to Ethernet PHY connections. In one embodiment, the physical connector may be PCIe (Peripheral Component Interconnect Express) connector. The node card 60 may have an enable of the physical connector (see CARD_EN in FIG. 2) that enables the server. The node card may have regulators included on the PCB to provide regulated power supplies to various parts of the server off the power supply that is provided through the PCIe physical connector and the enables (CARD_EN) may be connected to the regulators. The voltages on the node card may be 12V. The regulators may generate a common voltage that may be 3.3V (as shown in the example in FIG. 2), 1.8V, 0.9V and/or 1.35 or 1.5V. Each node card may have one or more SoCs 62, memory and appropriate regulators, but may also have multiple servers on the PCB including multiple SOC and multiple sets of DRAM (dynamic random access memory) and the DRAM is soldered on the PCB and signals are routed to the SOC. Alternatively, the DRAM is on a DIMM (ual in-lin memory mpodule) and the DIMM is connected to the PCB using a connector whose signals are routed to the SOC.

In the example in FIG. 2, the node card 60 may include one or more system on a chip (SOC) 62 (such as SOC0-SOC3 as shown in FIG. 2) and each SOC 62 (i.e., each an instance of a SOC unit) is part of a node 64, such as Node N0-N3 as shown, wherein the node may be a compute node, a storage node and the like. The SoCs on the node card may have heat sinks. Each node 64 may further include one or more LEDs, memory (DDR, for example), a clock, a temperature sensor (TEMP) connected to the SOC, an SD slot and an SPI_FLASH slot as shown in FIG. 2. Thus, the node card 60 may also have a storage card such as SD, uSD, MMC, eMMC that is connected to the SOC (as shown in the example below in FIG. 6). In one embodiment, a NAND or NOR can be used and connected to the SOC (such as in the examples in FIGS. 4-5 below) and/or a serial flash may be used and connected to the SOC.

The node card may also have one or more communication and/or storage connects 66, such as connects to various SATA devices, connects to XAUI interconnects and a UART that may be through an edge connector. In the node card, the server-to-server communication may be XAUI and one or more XAUI is routed to the PCIe physical connector and the XAUI signals are routed from the PCIe physical connector to the SOC and/or the XAUI signals are routed between SoCs on the PCB. In the node card, the server-to-server communication may be SGMII and one or more SGMII is routed to the PCIe physical connector and the SGMII signals are routed from the PCIe connector to the SOC or the SGMII signals are routed between SoCs on the PCB.

The node card may also have a SATA connector. The SATA signals may be routed from the SOC to the SATA connector or multiple SATA connectors are added to the PCB and multiple SATA connectors are routed from the SOC to the SATA connectors. The node card may also have a mini SATA on the Card or mSATA on the Card. The SATA may be routed to the PCIe physical connector from the SOC. In some embodiments, multiple SATA connections are made between the SOC and PCIe physical connector and PCIe x1 or x2, or x4, or x8 or x16 or x32 is used. The node card may use multiple PCIe physical connectors or any combination of multiple PCIe connectors such as x1 or x2, or x4, or x8 or x16 or x32. The DC values applied to the PCIe connector and routed onto the PCB for set up, control, ID or information and the DC values are routed to GPIOs on one or more SoCs.

The edge connector may also have signalling for JTAG and ALTBOOT (described below in more detail). The edge connector may also provide SLOT signalling, GPIO signalling and power (with an enable). The JTAG signals are routed from one or more SoCs to PCIe physical connector and the serial port and/or UART signals are routed from the PCIe physical connector to one or more SoCs. The SOC may have an addition signal or set of signals is routed to the PCIe physical connector that is used to arbitrate usage of the serial port or UART. In the system, a digital signal can be applied to the PCIe connector to cause an alternative boot procedure by connecting this signal from the PCIe connector to a signal on one or more SoCs that causes or enable an alternative boot. The digital signal or signals can be applied to the PCIe physical connector to cause an interrupt to the SOC or SoCs by connecting the SOC or SoCs to this digital signal on the connector. The system may have a level shifter(s) that is used on the PCB to translate a signal applied on the PCIe connector edge to a signal that is applied to the SOC(s). Furthermore, the digital signal that is routed from an SOC to the PCIe connector that resets and/or controls and/or provides info to an Ethernet phy or SFP that is not on the PCB and may be for reset, enable, disable, mdio, fault, loss of signal, rate.

Thus, the node 64 of the node card 60 forms what can be thought of as an independent cluster node. Each SOC 62 is an example of a node central processing unit (CPU) of the node card 60. An independent operating system (OS) is booted on the Node CPU. Linux Ubuntu brand operating system is an example of such an independent operating system.

As discussed below in greater detail, each SOC 62 includes one or more embedded PCIe controllers, one or more SATA controllers, and one or more 10 Gigabit (10 GigE) Ethernet MACs. Each node 64 is interconnected to other nodes via a high speed interconnect such that the topology of the interconnect is logically transparent to the user. Each node 64, even those that don't have direct access to an outside network, has network connectivity. Preferably, each node 64 has flash (i.e., flash storage space) that can be logically partitioned. A local file system (e.g., a Linux file system) can be created on one or more of the flash partitions. For example, the user can create a root and swap partition on local flash partitions. Furthermore, flash partitions can be aggregated to form large flash volumes. Typical operating system storage capabilities can be provided to create network file systems, clustered files systems, and/or iSCSI NAS systems on either the a storage portion of a node (e.g., a storage node portion) or remotely in the external network. As discussed below in greater detail, each node 64 includes power management functionality that is optimized transparently to the user. Accordingly, a skilled person will appreciate that the node 64 provides all of the characteristics that would normally be attributed to a node of a computer cluster as well as value-added functionalities (e.g., storage functionality, power management functionality, etc).

Figure 3:
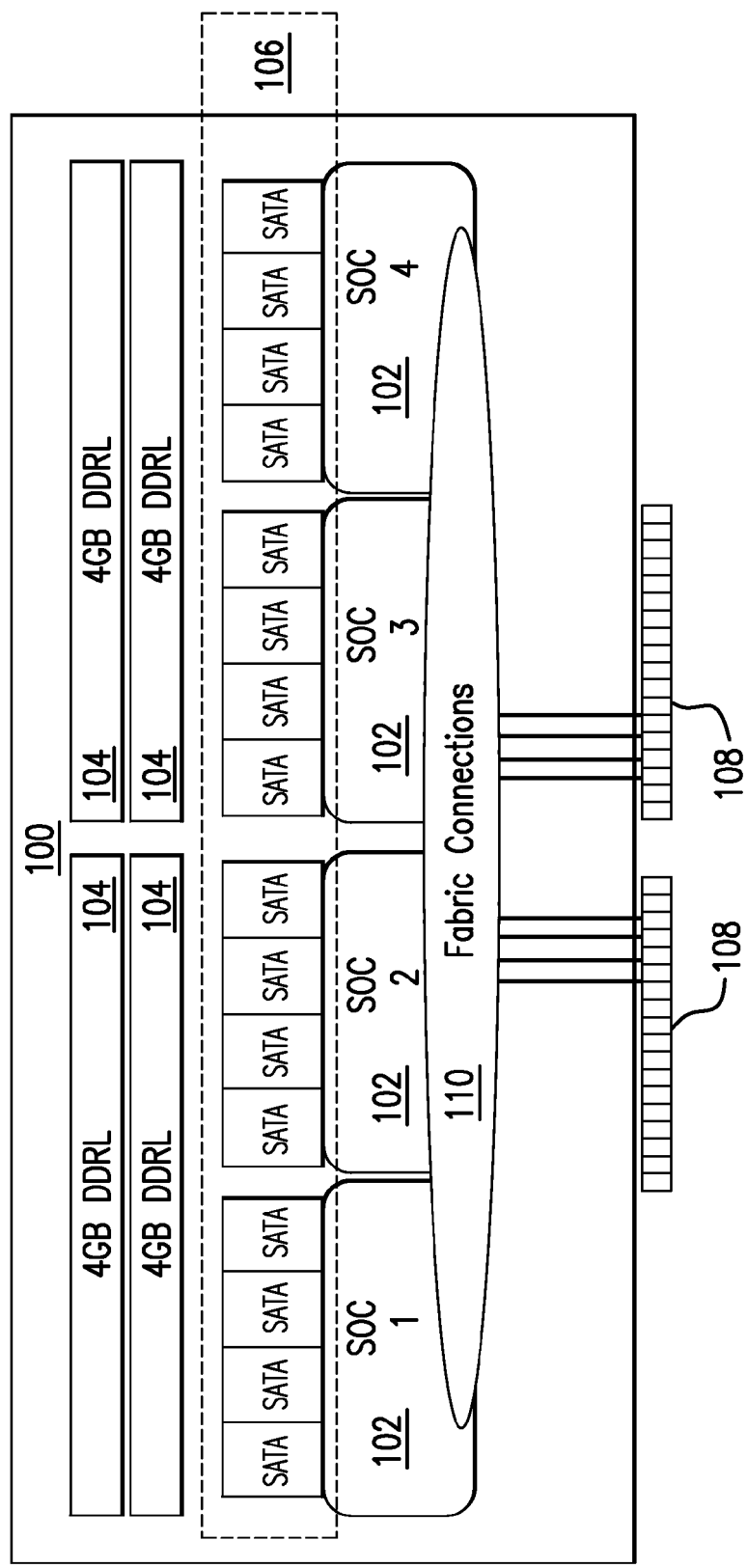
FIG. 3 illustrates an example of a quad node card.

FIG. 3 illustrates an example of a quad node card 100. The quad node card 100 may have one or more systems on a chip 103 (SoC0-SoC3 in this example), one or more volatile memory devices 104, such as four 4 GB DDR3 Mini-DIMMs (1 per node), one or more storage interfaces 106, such as sixteen SATA connectors (4 per node), one or more SD slots (one per node, MMC not supported) and one or more SPI flash chips (1 per node). The quad node card may be powered by 12V dc, supplied via edge connectors 108—all other voltages are internally generated by regulators. The quad node card may have server interconnect Fabric connections 110 routed via the edge connector 108, through a system board to which the node card is connected, to other node cards or external Ethernet transceivers and I2C and GPIO rout via the edge connector, per system board requirements. The quad node card 100 does not have Ethernet PHY transceivers in some implementations, other implementations may choose to use Ethernet transceivers on the node card and route this as the interconnect and the node card is not a stand alone design, but may be used with a system board.

The quad Card example consists of 4 server nodes, each formed by a Calxeda® EnergyNode SOC, with its DIMM and local peripherals, which runs Linux independently from any other node. By design, these nodes can be directly interconnected to form a high bandwidth fabric, which provides network access through the system Ethernet ports. From the network view, the server nodes appear as independent servers; each available to take work on.

Figure 4:
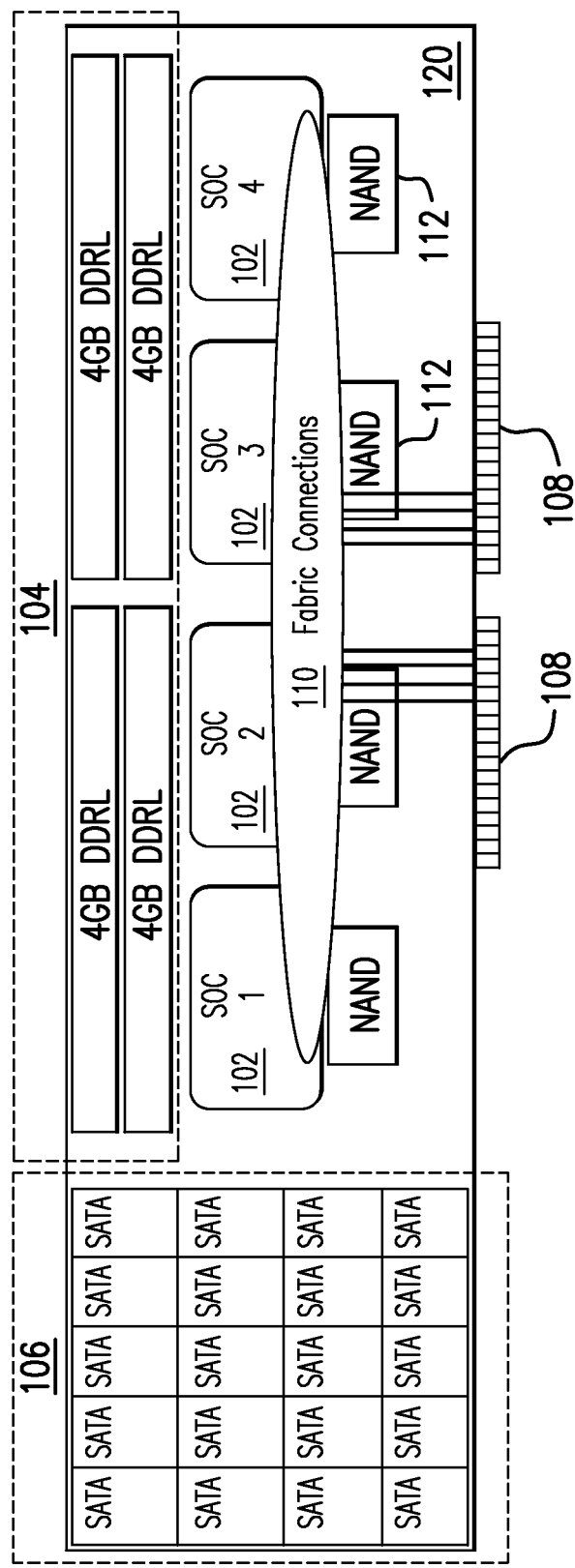
FIGS. 4 and 5 illustrate two examples of node cards with one or more connectors.
Figure 5:
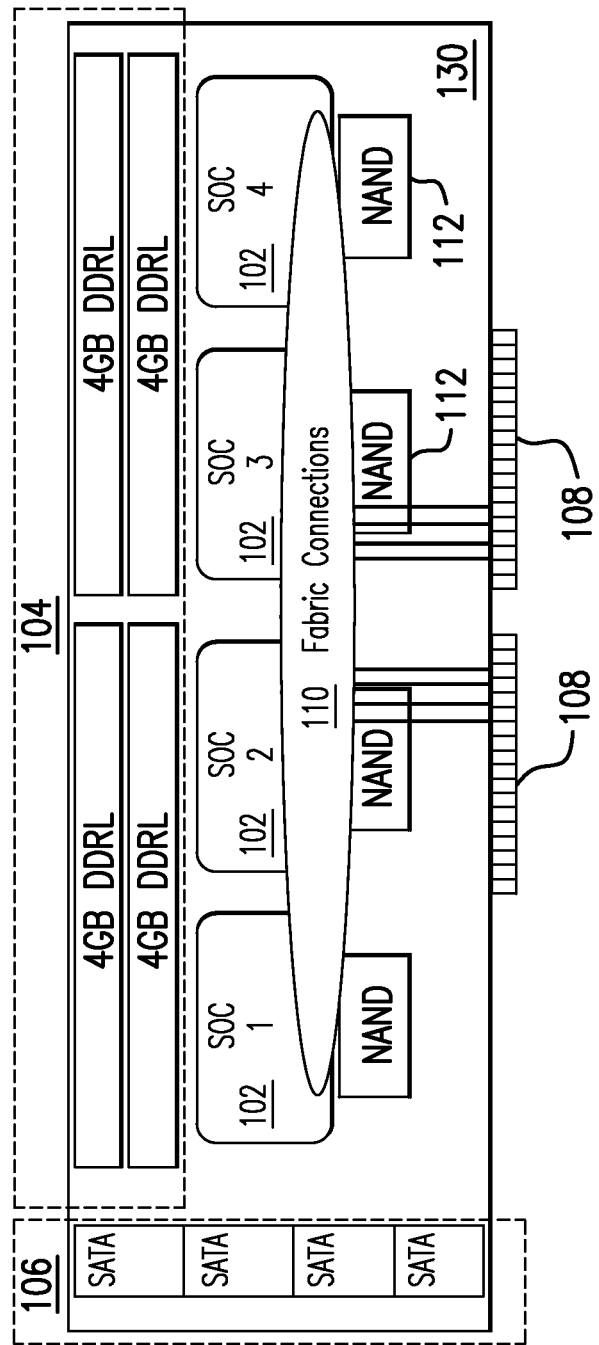

FIGS. 4 and 5 illustrate two examples of node cards 120, 130 with one or more connectors 108. The connectors may be a PCIe connector that makes a convenient physical interconnect between the node card and the system board, but any type of connector can be used. The connector type is selected based on its performance at the switching frequency of the fabric interconnect. For example, industry-standard Micro TCA connectors available from Tyco Electronics and Samtec operate up to 12 GHz. In the examples in FIGS. 4 and 5, the node card has the SOCs 102, the memory 104, the storage interfaces 106 and the fabric connector 110, but may also include one or more persistent memory devices 112, such as NAND flash. The node card definition can vary as seen below with variation in a number of SATA connectors and/or in a number of fabric interconnect for server-to-server communication. The type of PCIe connector in the node card could vary significantly based on quantity of interconnect and other signals desired in the design. FIGS. 4 and 5 shows two PCIe x16 connectors, but the node cards could vary using any quantity of PCIe connector and any type of PCIe (x1, x2, x4 etc. . . . ). Though not shown in FIG. 4 or 5 for brevity, since fabric connectivity exists with the node cards, the physical Ethernet interfaces depicted on the System Board 42 can also reside on the node cards.

Figure 6:
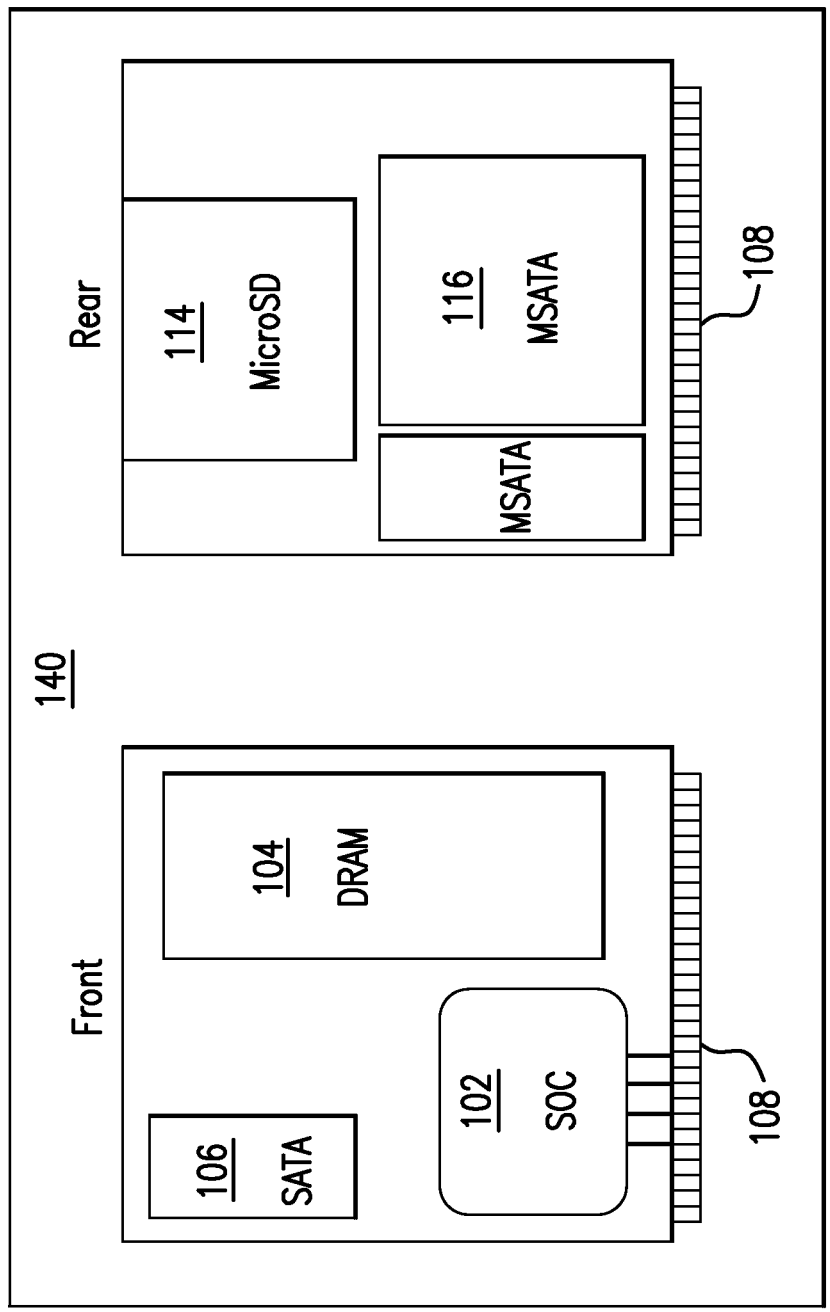
FIG. 6 illustrates an example of a single server node card.

FIG. 6 illustrates an example of a single server node card 140. The single server node card 140 may have one processor SOC 102, a 4 GB DDR3 DRAM 104 down (no DIMM), a microSD slot 114, a SATA data connector 106, a mSATA connector 116, one or more XAUI channels (four in this example) to the edge connector 108 for fabric connectivity and may be smaller than 2-inch×4-inch. This combination provides the compute, networking IO, system memory, and storage interfaces needed for a robust ARM server, in a form factor that is easily integrated into many chassis designs. This node card implements a x16 PCI connector with a custom electrical signalling interface that follows the Ethernet XAUI interface definition. The node card 140 may be a two-sided printed circuit board with components on each side as shown in FIG. 6.

Figure 7:
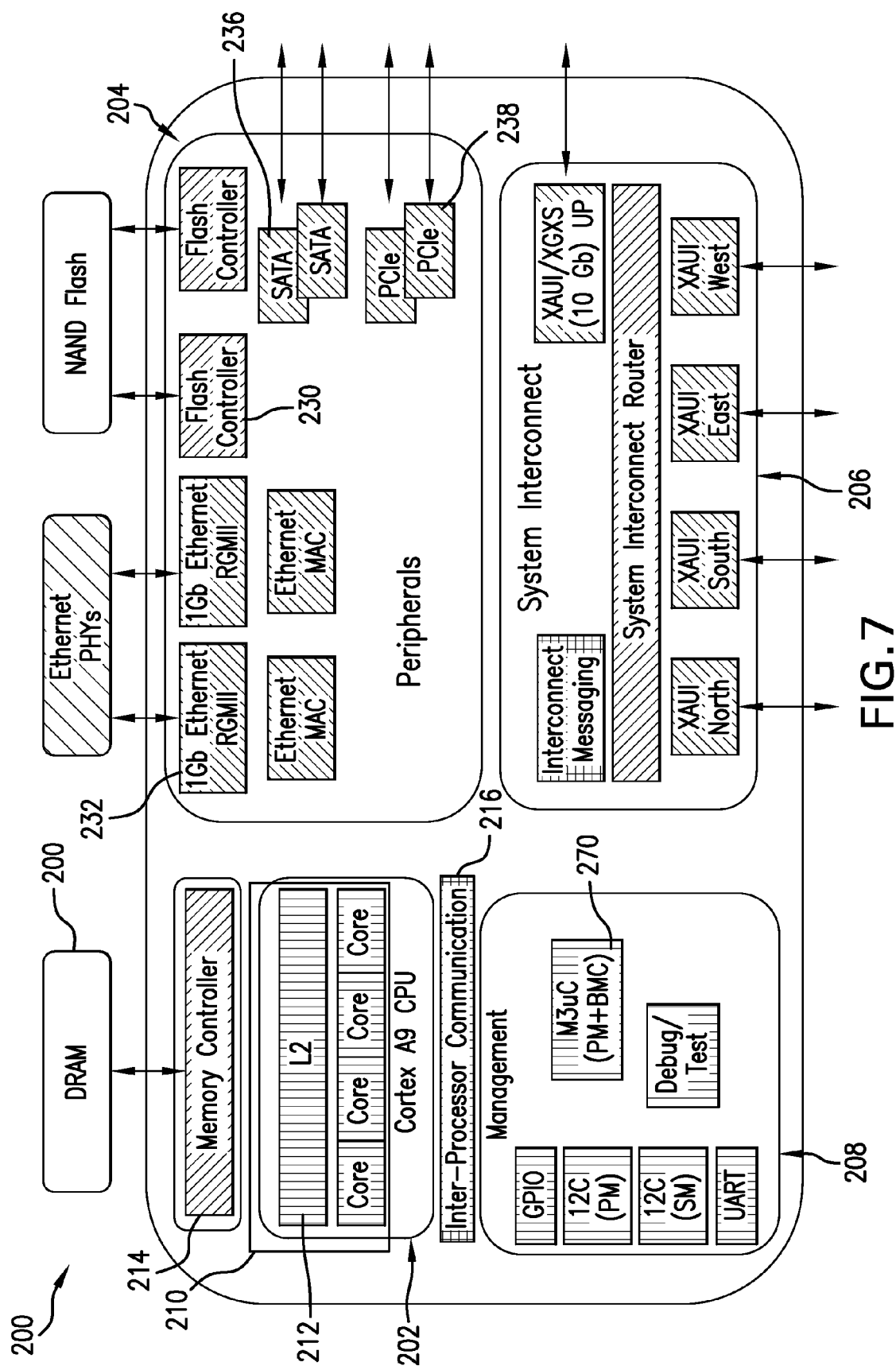
FIG. 7 illustrates a logical view of a system on a chip (SOC)
Figure 8A:
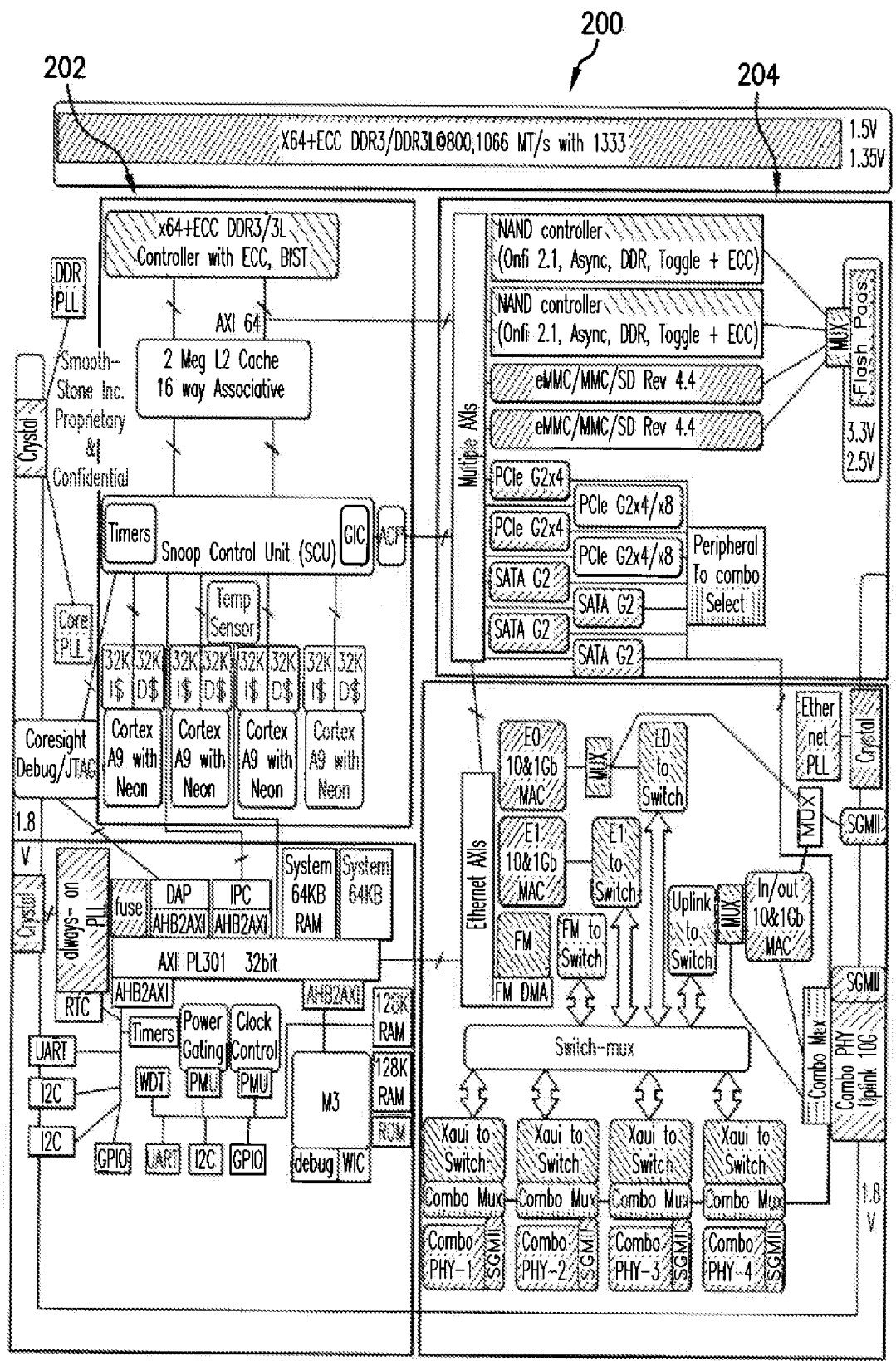
FIG. 8A illustrates an architectural block diagram view of a SOC showing subsystems thereof.
Figure 8B:
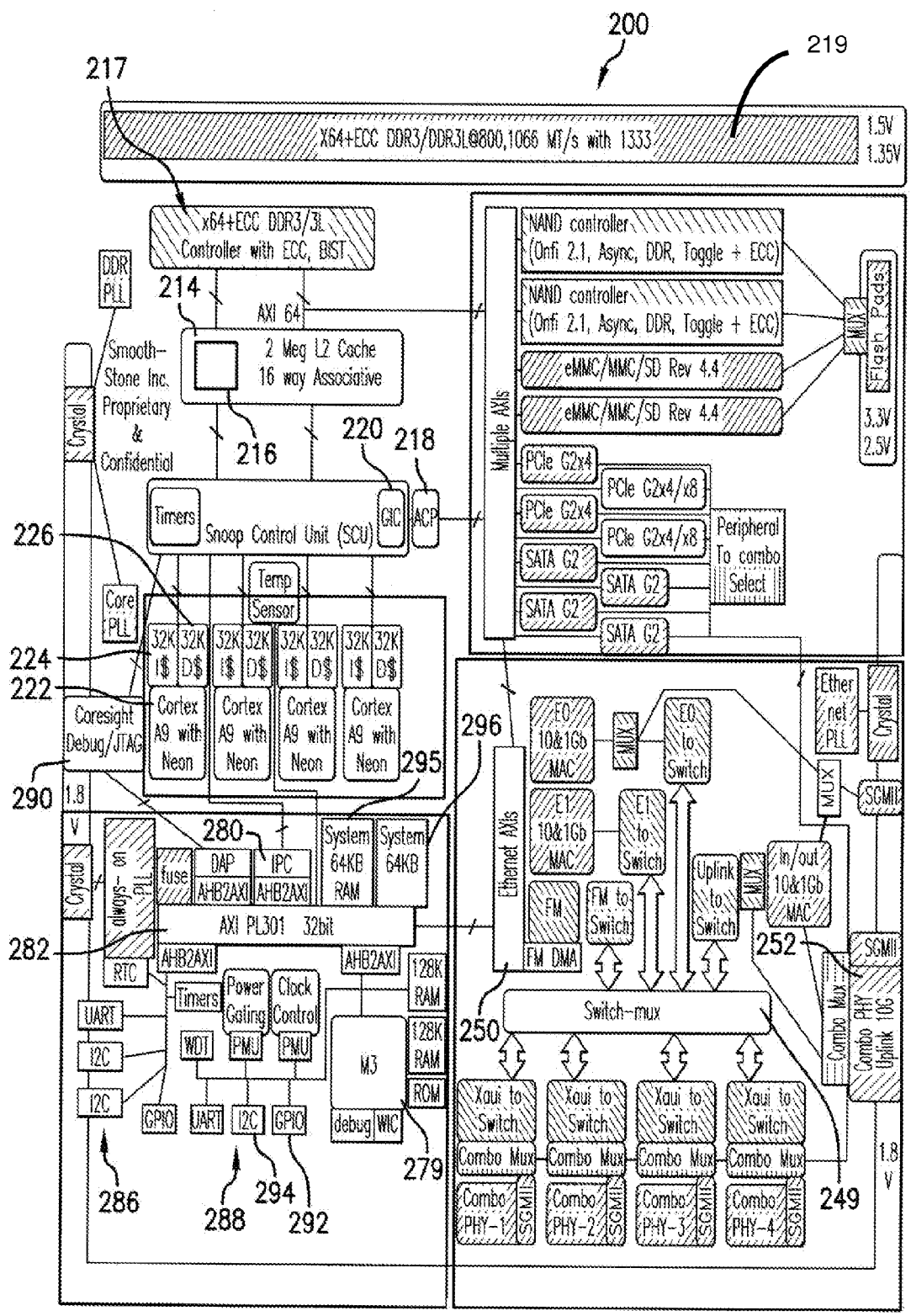
FIG. 8B illustrates an architectural block diagram view of a SOC showing architectural elements thereof.

FIGS. 7, 8A and 8B show a SOC 200 (i.e., an instance of a SOC unit) configured in accordance with the present invention. The SOC 200 is a specific example of the SoCs discussed above in reference to FIGS. 2-6 (e.g., SOC 62 and/or SOC 102). In this regard, the SOC 200 can be utilized in standalone manner such as, for example, as discussed in reference to FIG. 6. Alternatively, the SOC 200 can be utilized in combination with a plurality of other SoCs on a node card such as, for example, with each one of the SoCs being associated with a respective node of the node card as discussed above in reference to FIGS. 2-5.

The SOC 200 includes a node CPU subsystem 202, a peripheral subsystem 204, a system interconnect subsystem 206, and a management subsystem 208. In this regard, a SOC configured in accordance with the present invention can be logically divided into several subsystems. Each one of the subsystems includes a plurality of operation components therein that enable a particular one of the subsystems to provide functionality thereof. Furthermore, as will be discussed below in greater detail, each one of these subsystems is preferably managed as independent power domains.

Figure 9:
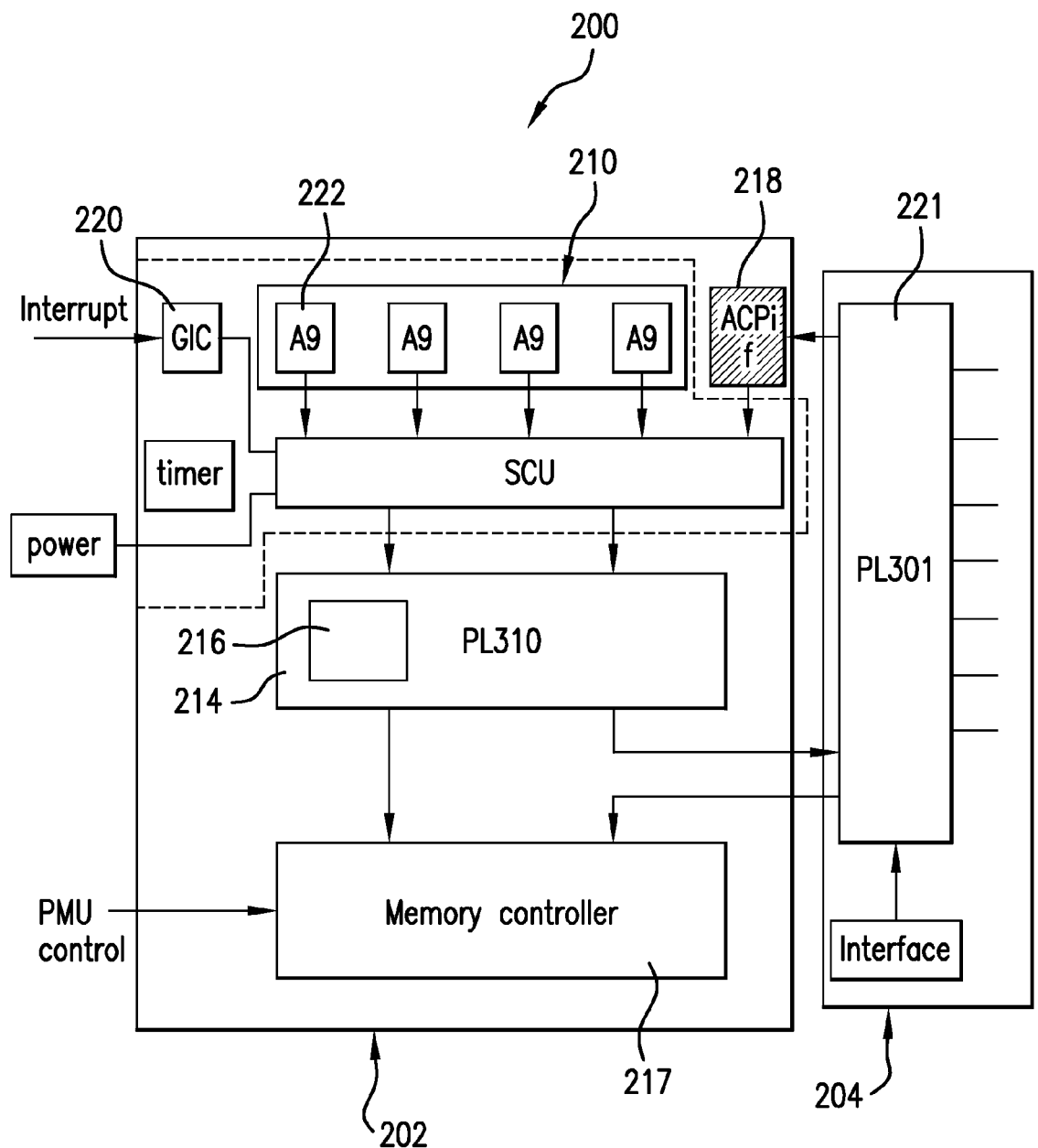
FIG. 9 illustrates a logical view of a SOC node CPU subsystem.

The node CPU subsystem 202 of SOC 200 provides the core CPU functionality for the SOC, and runs the primary user operating system (e.g. Ubuntu Linux). As shown in FIGS. 7-9, the Node CPU subsystem 202 comprises a node CPU 210, a snoop control unit (SCU) 212, L2 cache 214, a L2 cache controller 216, memory controller 217, an accelerator coherence port (ACP) 218, main memory 219 and a generalized interrupt controller (GIC) 220. The node CPU 210 includes 4 processing cores 222 that share the L2 cache 214. Preferably, the processing cores 222 are each an ARM Cortex A9 brand processing core with an associated media processing engine (e.g., Neon brand processing engine) and each one of the processing cores 222 has independent L1 instruction cache 224 and L1 data cache 226. Alternatively, each one of the processing cores can be a different brand of core that functions in a similar or substantially the same manner as ARM Cortex A9 brand processing core. Each one of the processing cores 222 and its respective L1 cache 224, 226 is in a separate power domain. Optionally, the media processing engine of each processing core 222 can be in a separate power domain. Preferably, all of the processing cores 222 within the node CPU subsystem 202 run at the same speed or are stopped (e.g., idled, dormant or powered down).

The SCU 212 is responsible for managing interconnect, arbitration, communication, cache-to-cache, system memory transfers, and cache coherency functionalities. With regard to cache coherency, the SCU 212 is responsible for maintaining coherence between the L1 caches 224, 226 and ensuring that traffic from the ACP 218 is made coherent with the L1 caches 224, 226. The L2 cache controller 216 can be a unified, physically addressed, physically tagged cache with up to 16 ways.

The memory controller 217 is coupled to the L2 cache 214 and to a peripheral switch 221 of the peripheral subsystem 204. Preferably, the memory controller 217 is configured to control a plurality of different types of main memory (e.g., DDR3, DDR3L, LPDDR2). An internal interface of the memory controller 217 includes a core data port, a peripherals data port, a data port of a power management unit (PMU) portion of the management subsystem 208, and an asynchronous 32-bit AHB slave port. The PMU data port is desirable to ensure isolation for some low power states. The asynchronous 32-bit AHB slave port is used to configure the memory controller 217 and access its registers. The asynchronous 32-bit AHB slave port is attached to the PMU fabric and can be synchronous to the PMU fabric in a similar manner as the asynchronous interface is at this end. In one implementation, the memory controller 217 is an AXI interface (i.e., an Advanced eXtensible Interface) offered under the brand Databahn, which includes an AXI interface, a Databahn controller engine and a PHY (DFI).

The ACP 218 provides the function of ensuring that system traffic (e.g., I/O traffic, etc) can be driven in order to ensure that there is no need to flush or invalidate the L1 caches 224, 226 to see the data. In this regard, the ACP 218 can server as a slave interface port to the SCU 212. Read/write transactions can be initiated by an AXI master through the ACP 218 to either coherent or non-coherent memory. For read/write transactions to coherent regions of memory, the SCU 212 will perform necessary coherency operations against the L1 caches 224, 226, the L2 cache 214 and the main memory 219.

The GIC 220 can be integrated into the SCU 212. The GIC 220 provides a flexible approach to inter-processor communication, routing, and prioritization of system interrupts. The GIC 220 supports independent interrupts such that each interrupt can be distributed across CPU subsystem, hardware prioritized, and routed between the operating system and software management layer of the CPU subsystem. More specifically, interrupts to the processing cores 222 are connected via function of the GIC 220.

The node CPU subsystem 202 can include other elements/modules for providing further functionalities. One example of such further functionality is provided by a L2 MBIST (i.e., memory build-in self trust) controller that is integrated with the L2 cache controller 216 for performing memory testing of the L2 cache 214. Still another example of such further functionality is provided by a direct memory access (DMA) controller (i.e., a DMAC) that provides an AXI interface to perform DMA transfers and that has two APB interfaces that control operation of the DMAC.

Figure 10:
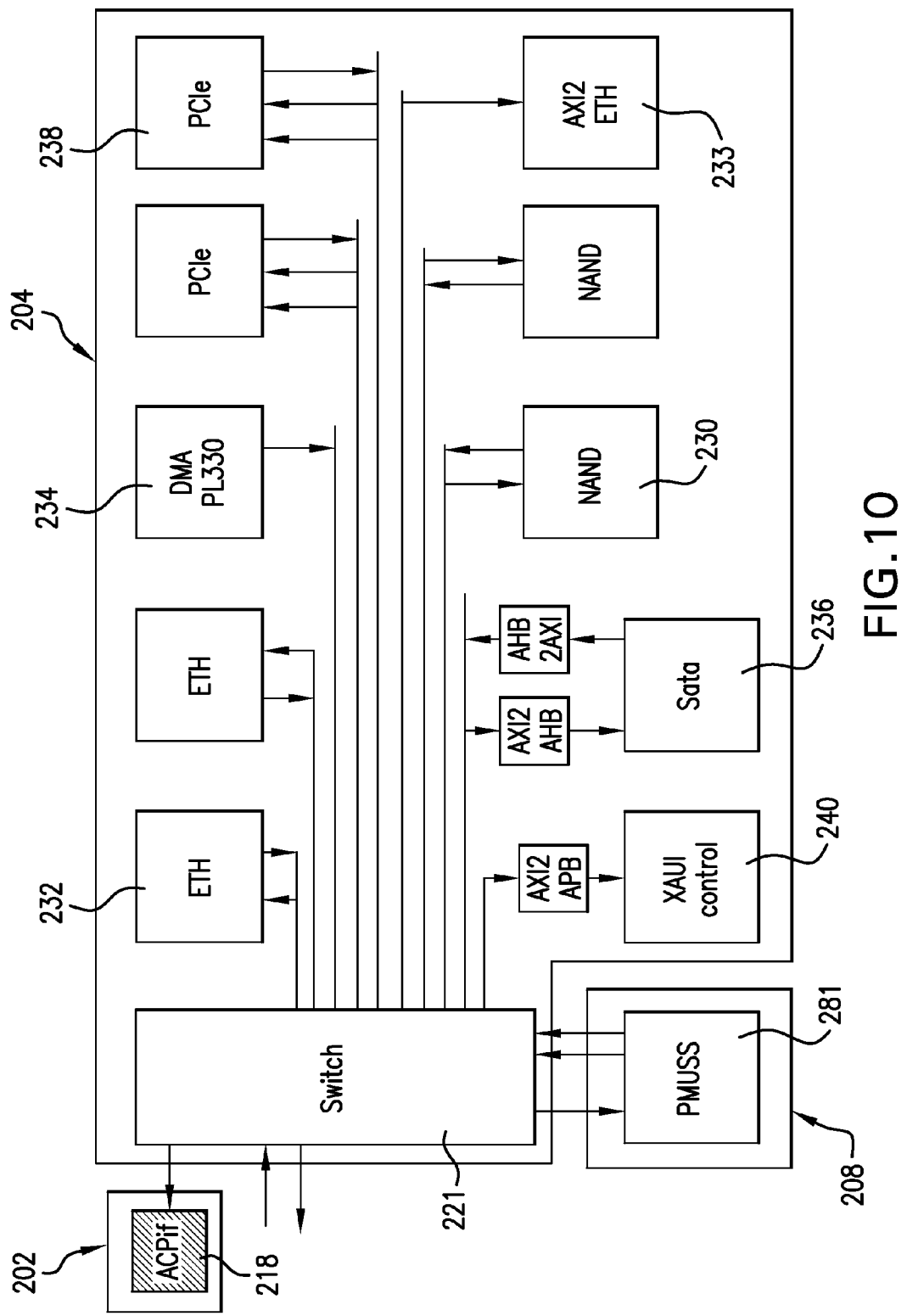
FIG. 10 illustrates a logical view of a peripheral subsystem.
Figure 11:
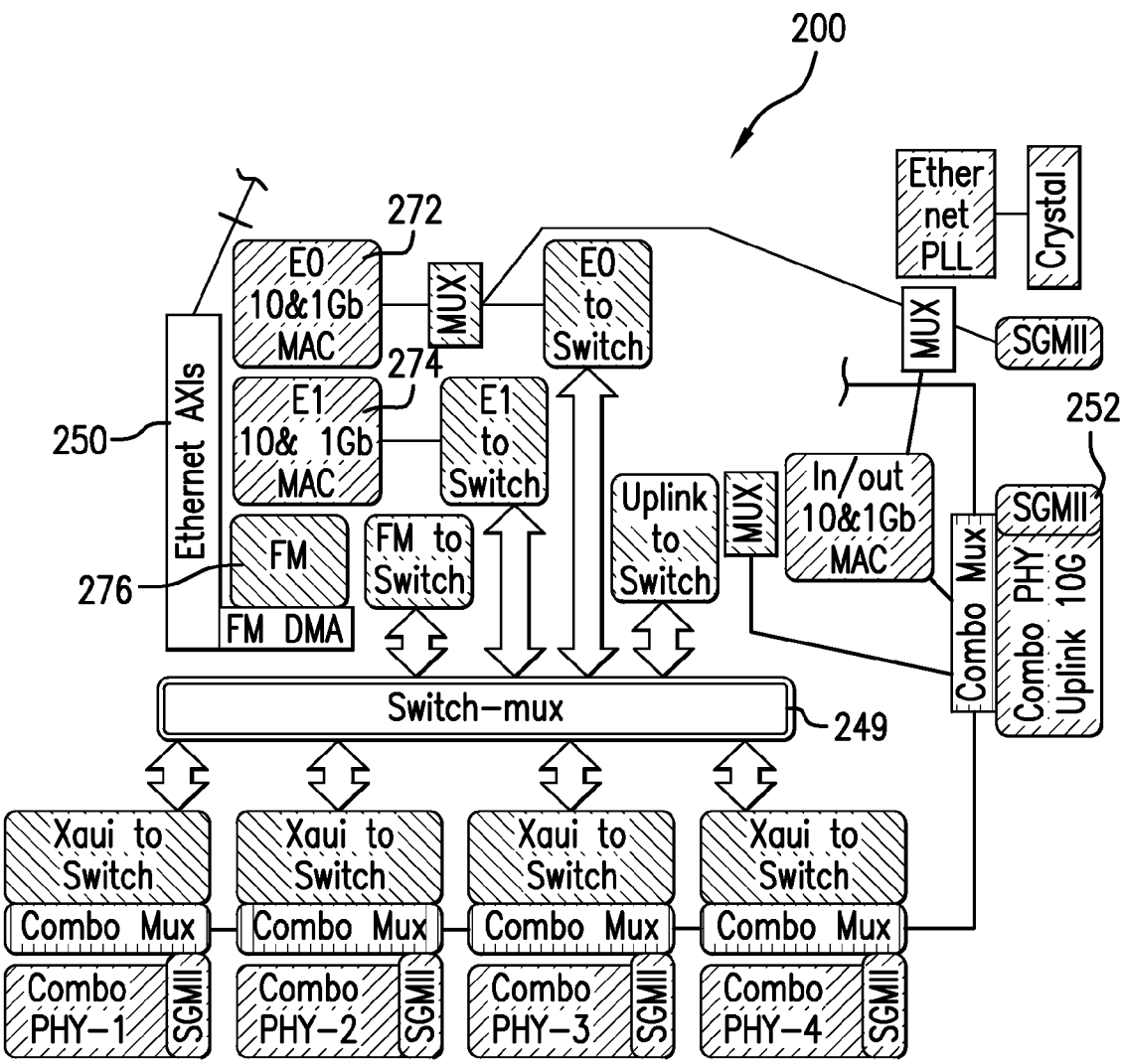
FIG. 11 illustrates an architectural block diagram view of a system interconnect subsystem.
Figure 12:
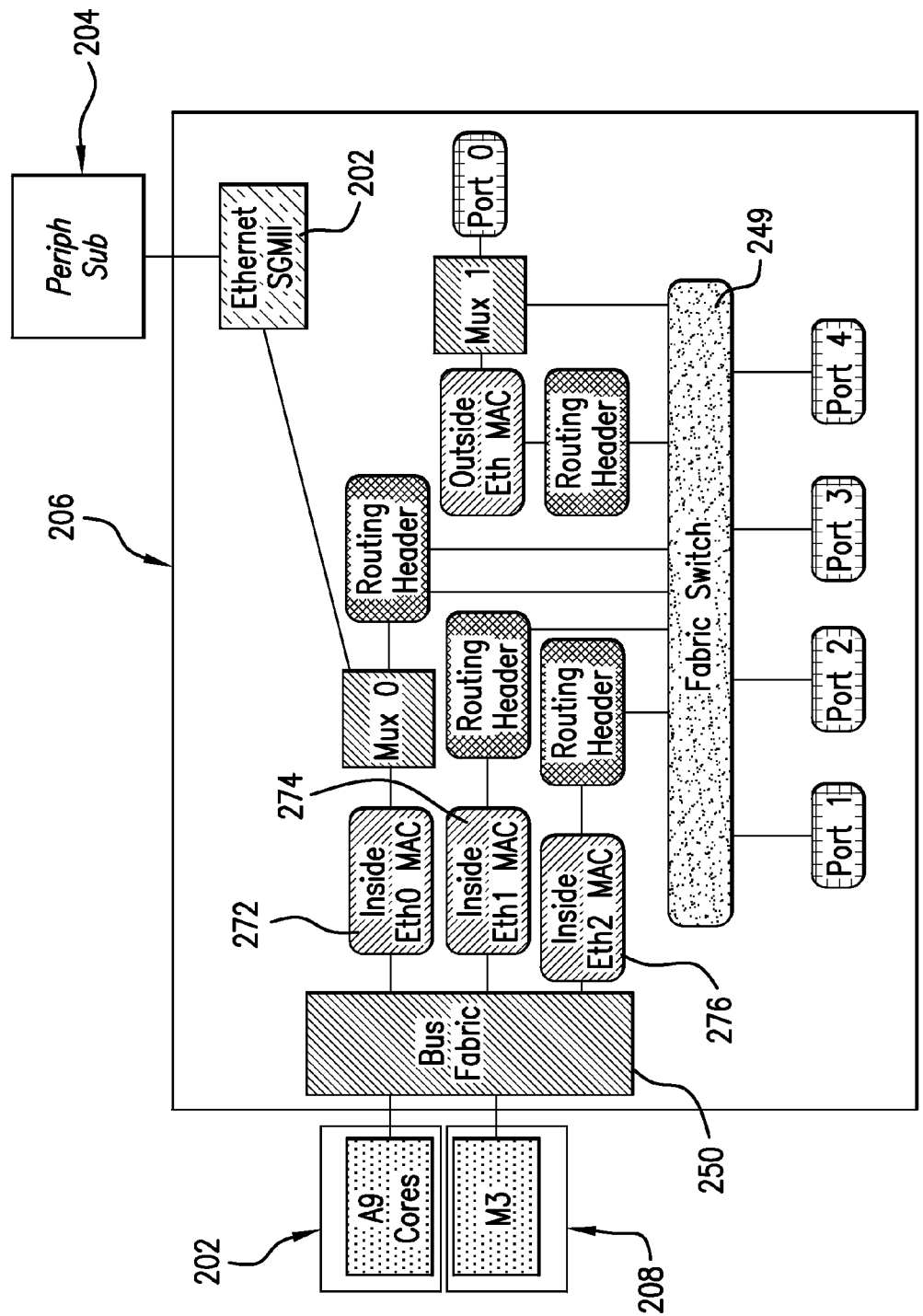
FIG. 12 illustrates a logical view of a system interconnect subsystem.

The peripheral subsystem 204 of SOC 200, shown in FIGS. 7, 8 and 10, has the primary responsibility of providing interfaces that enable information storage and transfer functionality. This information storage and transfer functionality includes information storage and transfer both within a given SOC Node and with SOC Nodes accessibly by the given SOC Node. Examples of the information storage and transfer functionality include, but are not limited to, flash interface functionality, PCIe interface functionality, SATA interface functionality, and Ethernet interface functionality. The peripheral subsystem 204 can also provide additional information storage and transfer functionality such as, for example, direct memory access (DMA) functionality. Each of these peripheral subsystem functionalities is provided by one or more respective controllers that interface to one or more corresponding storage media (i.e., storage media controllers).

The peripherals subsystem 204 includes the peripheral switch 221 and a plurality of peripheral controllers for providing the abovementioned information storage and transfer functionality. The peripheral switch 221 can be implemented in the form of a High-Performance Matrix (HPM) that is a configurable auto-generated advanced microprocessor bus architecture 3 (i.e., AMBA protocol 3) bus subsystem based around a high-performance AXI crossbar switch known as the AXI bus matrix, and extended by AMBA infrastructure components.

The peripherals subsystem 204 includes flash controllers 230 (i.e. a first type of peripheral controller). The flash controllers 230 can provide support for any number of different flash memory configurations. A NAND flash controller such as that offered under the brand name Denali is an example of a suitable flash controller. Examples of flash media include MultiMediaCard (MMC) media, embedded MultiMediaCard (eMMC) media, Secure Digital (SD) media, SLC/MLC+ECC media, and the like. Memory is an example of media (i.e., storage media) and error correcting code (ECC) memory is an example of a type of memory to which the main memory 217 interfaces (e.g., main memory 219).

The peripherals subsystem 204 includes Ethernet MAC controllers 232 (i.e. a second type of peripheral controller). Each Ethernet MAC controller 232 can be of the universal 1 Gig design configuration or the 10 G design configuration. The universal 1 Gig design configuration offers a preferred interface description. The Ethernet MAC controllers 232 includes a control register set and a DMA (i.e., an AXI master and an AXI slave). Additionally, the peripherals subsystem 204 can include an AXI2 Ethernet controller 233

The peripherals subsystem 204 includes a DMA controller 234 (i.e., (i.e. a third type of peripheral controller). The DMA controller 234 includes a master port (AXI) and two APB slave ports (i.e., one for secure communication and the other for non-secure communication). DMA requests are sent to the DMA controller 234 and interrupts are generated from the DMA controller 234. A basic assumption in regard to the DMA controller 234 is that it needs to be able to transfer data into and out of the L2 cache 214 to ensure that the memory remains coherent and it also needs to access the peripherals of the peripheral subsystem 204. As such, this implies that the DMA controller 234 needs to connect into two places in the system. The most obvious approach to accomplish this is to provide a DMA fabric and plug the DMA fabric into both the CONFAB (i.e., the connection to the slave ports of the main peripherals) and the ACPFAB (i.e., the ACP fabric) as additional master, thereby providing connectivity to the PMU (i.e., a portion of the management subsystem 208) which allows access to all the slaves and the ACP fabric). An alternative approach is to connect only into the ACP and rely on the L2 cache 214 to pass the access through the SCU 212 and L2 cache 214 and then back out on the core port to the CONFAB (and then reverse). This alternate approach needs to ensure that the SCU 212 understand that those accesses do not create L2 entires. Furthermore, the alternate approach may not be operable in the power-down case (i.e., when the only the management processor and switch fabric of the management subsystem 208 are active) and may not allow DMA into the private memory of the management subsystem 208. However, these scenarios are acceptable because DMA functionality is useful only for fairly large transfers. Thus, because private memory of the management subsystem 208 is relatively small, the assumption is that associated messages will be relatively small and can be handled by INT. If the management subsystem 208 needs/wants large data transfer, it can power up the whole system except the cores and then DMA is available.

The peripherals subsystem 204 includes a SATA controller 236 (i.e. a fourth type of peripheral controller). Preferably, the SATA controller 236 has two AHB ports: one master for memory access and one slave for control and configuration. The peripherals subsystem 204 also includes PCIe controllers 238. Preferably, the PCIe controllers 238 use a DWC PCIe core configuration as opposed to a shared DBI interface so that a plurality of AXI interfaces: a master AXI interface, a slave AXI interface and a DBI AXI interface. As will be discussed below in greater detail, a XAUI controller 240 of the peripherals subsystem 204 is provided for enabling interfacing with other CPU nodes (e.g., of a common node card).

FIGS. 7, 8B, 11 and 12 show block diagrams of the system interconnect subsystem 206 (also referred to herein as the fabric switch). The system interconnect subsystem 206 is a packet switch that provides intra-node and inter-node packet connectivity to Ethernet and within a node cluster (e.g., small clusters up through integration with heterogeneous large enterprise data centers). The system interconnect subsystem 206 provides a high-speed interconnect fabric, providing a dramatic increase in bandwidth and reduction in latency compared to traditional servers connected via 1 Gb Ethernet to a top of rack switch. Furthermore, the system interconnect subsystem 206 is configured to provide adaptive link width and speed to optimize power based upon utilization.

An underlying objective of the system interconnect subsystem 206 is support a scalable, power-optimized cluster fabric of server nodes. As such, the system interconnect subsystem 206 has three primary functionalities. The first one of these functionalities is serving as a high-speed fabric upon which TCP/IP networking is built and upon which the operating system of the node CPU subsystem 202 can provide transparent network access to associated network nodes and storage access to associated storage nodes. The second one of these functionalities is serving as a low-level messaging transport between associated nodes. The third one of these functionalities is serving as a transport for remote DMA between associated nodes.

The system interconnect subsystem 206 is connected to the node CPU subsystem 202 and the management subsystem 208 through a bus fabric 250 (i.e., Ethernet AXIs) of the system interconnect subsystem 206. An Ethernet interface 252 of the system interconnect subsystem 206 is connected to peripheral interfaces (e.g., interfaces 230, 232, 234, 238) of the peripheral subsystem 204. A fabric switch 249 (i.e., a switch-mux) is coupled between the ports 0-4 and the MAC's 272, 274, 276. Port 1-4 are XAUI link ports (i.e., high-speed interconnect interfaces) enabling the node that comprises the SOC 200 to be connected to associated nodes each having their own SOC (e.g., identically configured SoCs). Port 0 can be mux'd to be either a XAUI link port or an Outside Ethernet MAC port.

The processor cores 222 (i.e., A9 cores) of the node CPU subsystem 202 and management processor 270 (i.e., M3) of the management subsystem 208 can address MACs 272, 274, 276 of the system interconnect subsystem 206. In certain embodiments, the processor cores 222 of the node CPU subsystem 202 will utilize first MAC 272 and second MAC 274 and the management processor 270 of the management subsystem 208 will utilize the third MAC 276. To this end, MACs 272, 274, 276 can be configured specifically for their respective application (e.g., the first and second MACs 272, 274 providing 1 G and/or 10 G Ethernet functionality and the third MAC 276 providing DMA functionality).

The system interconnect subsystem 206 provides architectural support for various functionalities of the management subsystem 208. In one example, the system interconnect subsystem 206 supports network proxying functionality. As discussed below in greater detail, network proxy functionality allows the management processor of a CPU node to process or respond to network packets received thereby while the respective processing cores are in low-power "sleep" states and intelligently wake one or more of the respective processing cores when further network processing is needed thereby allowing the CPU node to maintain network presence. Another example is that the system interconnect subsystem 206 supports the ability for the management processor of a CPU node to optionally snoop locally initiated broadcasts (e.g., commonly to capture gratuitous ARPs).

The system interconnect subsystem 206 can be implemented in a manner that enables an ability to measure and report on utilization on each of the links provided via the system interconnect subsystem 206. To this end, a global configuration register (FS_GLOBAL_CFG) can be configured to enable utilization and statistics measurement, to select the utilization measurement time period, and to set the statistics counter interrupt threshold. A bandwidth alarm registers can allow software to configure a plurality of thresholds that, when crossed, causes a respective bandwidth alarm alert (e.g., that can generate an interrupt to the management processor 270). Bandwidth alarms can be are enabled in a channel configuration register. Transmit and receive bandwidth on each of the MAC ports can be read from the a channel bandwidth register.

Figure 13:
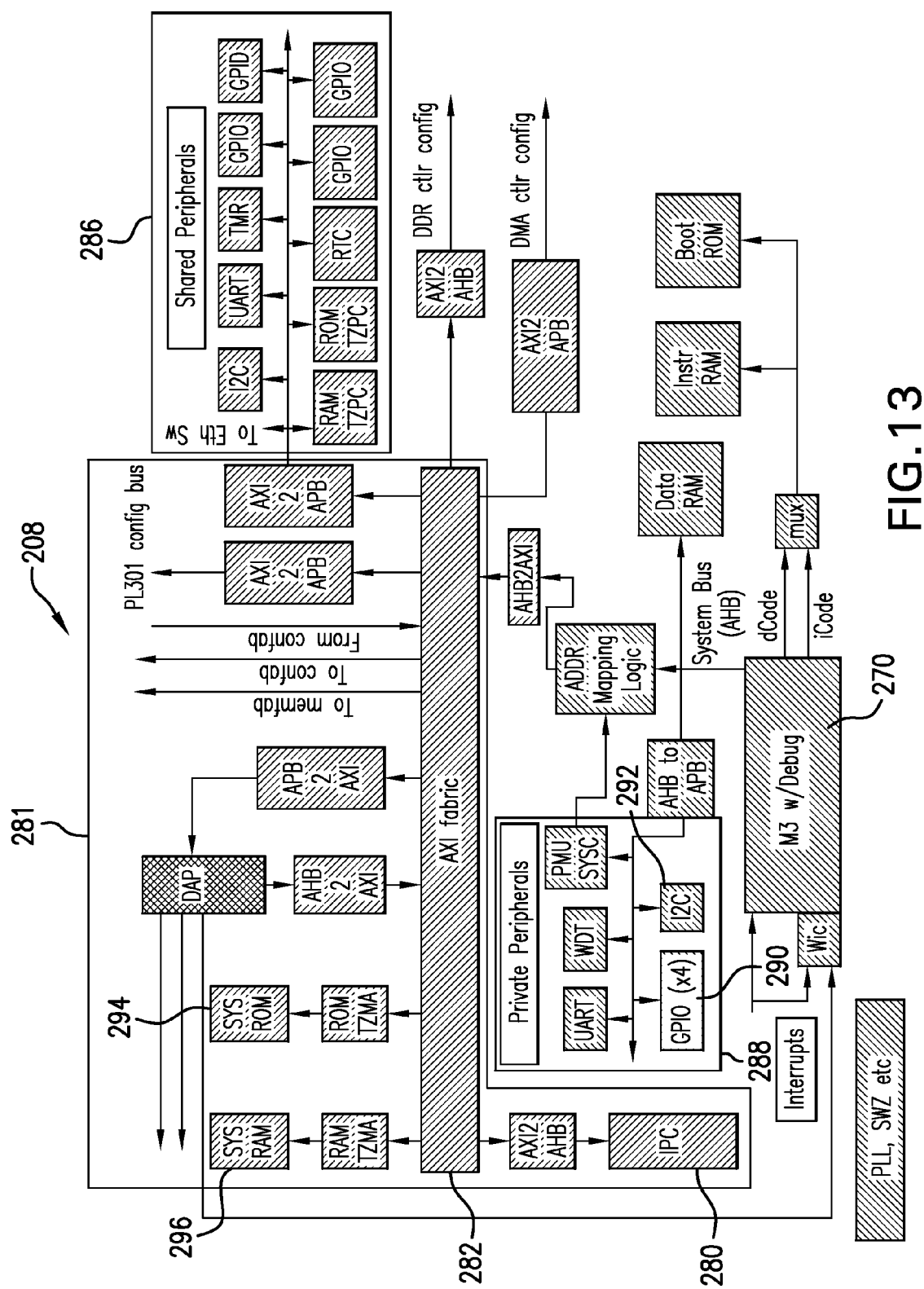
FIG. 13 illustrates a logical view of a power management unit of a management subsystem.

Turning now to FIGS. 7, 8B and 13, a discussion of the management subsystem 208 is provided. As best shown in FIG. 8, the management subsystem 208 is coupled directly to the node CPU subsystem 202 and directly to the to the system interconnect subsystem 206. An inter-processor communication (IPC) module (i.e., IPCM) 281 of the management subsystem 208, which includes IPC 280, is coupled to the SCU 212 of the node CPU subsystem 202, thereby directly coupling the management subsystem 208 to the node CPU subsystem 202. An AXI fabric 282 of the IPCM 281 is coupled to the bus fabric 250 of the system interconnect subsystem 206, thereby directly coupling the management subsystem 208 to the system interconnect subsystem 206

Figure 14:
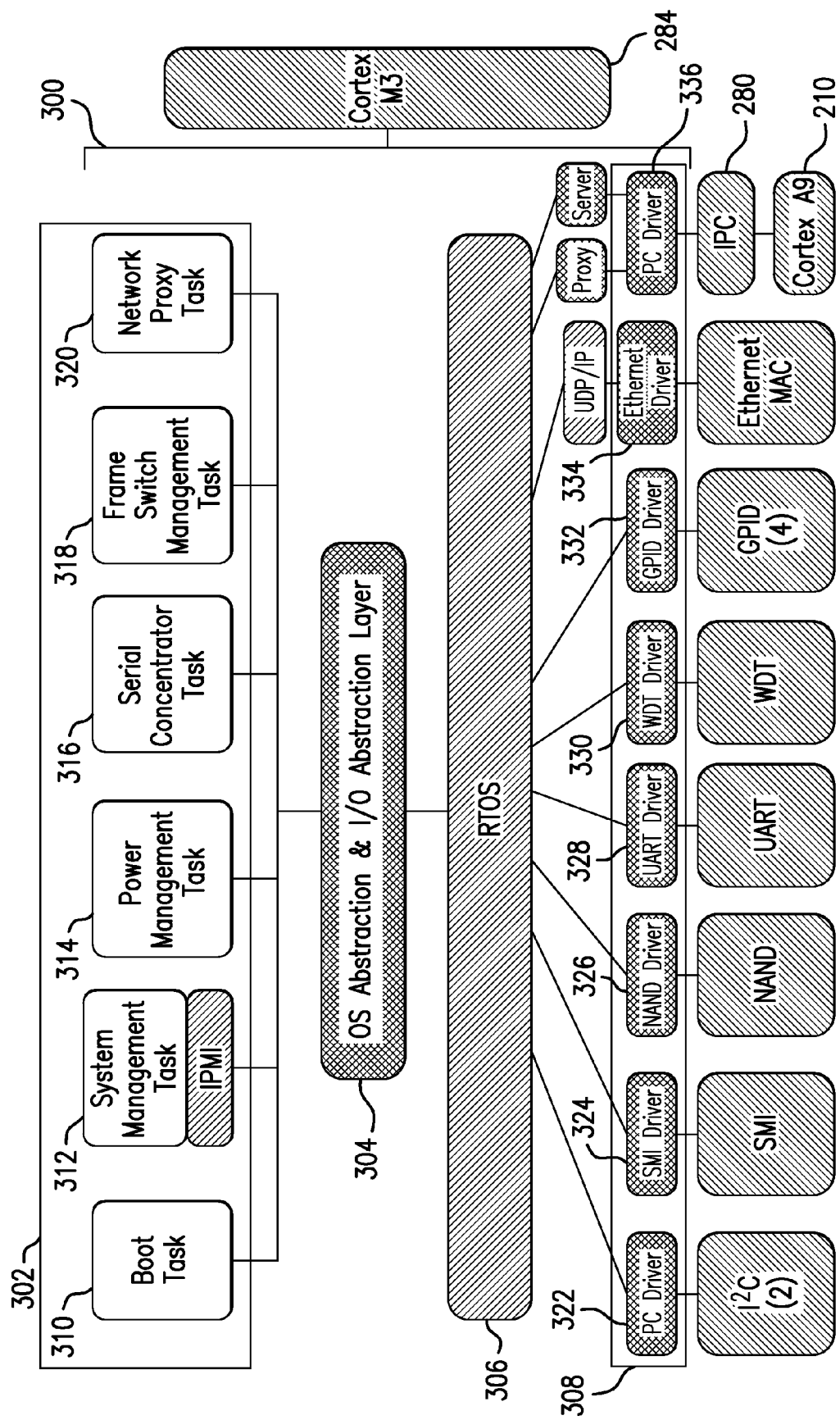
FIG. 14 illustrates a software view of a power management unit.

The management processor 270 of the management subsystem 208 is preferably, but not necessarily, an ARM Cortex brand M3 microprocessor. The management processor 270 can have private ROM and private SRAM. As best shown in FIGS. 8 and 14, the management processor 270 is coupled to shared peripherals 286 and private peripherals 288 of the management subsystem 208. The private peripherals 288 are only accessible by the management processor 270, whereas the shared peripherals 286 are accessible by the management processor 270, each of the processing cores 222, and a debug unit 290 of the SOC 200.

The management processor 270 can see master memory map with only DRAM requiring mapping. The management processor 270 utilizes GPIO 292 and I2C 294 (i.e., private peripherals) for controlling power and clocks in the node. Main code and working space for the management processor 270 are on the local Dcode and Icode buses but code can be executed from the system bus (i.e., the main ROM 295 & RAM 296 and, if necessary, external memory). The IPCM 281, which is used for software communication between the management processor 270 and the processing cores 222, can include 8 mailboxes (e.g., each with 7 data registers) and 8 interrupts (e.g., interrupts 0:3 are sent to the management processor 270 and interrupts 4:7 are sent to the GIC 220 of the node CPU subsystem 202). The management processor 270 can utilize a system management interface (SMI) functionality to carry IPMI (i.e., intelligent platform management interface) traffic (e.g., to/from the processing cores 222). For example, IPMI communication via SMIC (Server Management Interface Chip) between the processing cores 222 the management processor 270 is implemented with a private communication channel leverages the IPCM 281. This implements the SMIC protocol with mailbox features of the IPCM 281 coupled with memory buffers.

One capability that leverages the management processor 270 having control and visibility of all peripherals and controllers is that the management processor 270 can field error interrupts from each of the peripheral controllers. One example is that DRAM errors reported by the DRAM controller generate interrupts and the management processor 270 can log and report the errors. The management processor 270 can then attempt dynamic recovery and improvement by techniques including, but not limited to, increasing the voltage to the DRAM controller or the DIMMs in an attempt to reduce bit errors.

Additional capabilities arise because the management processor 270 has visibility into all buses, peripherals, and controllers. It can directly access registers for statistics on all buses, memory controllers, network traffic, fabric links, and errors on all devices without disturbing or even the knowledge of the access by the core processing cores 222. This allows for billing use cases where statistics can be gathered securely by the management processor without having to consume core processing resources (e.g., the processing cores 222) to gather, and in a manner that cannot be altered by the core processor 222.

An alternative Coresight/JTAG debug bus is coupled to the management processor 270. This Coresight/JTAG debug bus serves as an infrastructure that provides an alternate back door interface into all on-chip devices, even if the main busses are unavailable. This also provides for security and intrusion detection use cases where the management processor can detect anomalous accesses and disable internal busses or controllers for self-protection. Additionally, leveraging this pervasive access, the management processor can read all on-chip and CPU registers and memory images for post-mortem analysis for debug.

The management processor 270 has a plurality of responsibilities within its respective node. One responsibility of the management processor 270 is booting an operating system of the node CPU 210. Another responsibility of the management processor 270 is node power management. Accordingly, the management subsystem 208 can also be considered to comprise a power management Unit (PMU) for the node and thus, is sometime referred to as such. As discussed below in greater detail, the management subsystem 208 controls power states to various power domains of the SOC 200 (e.g., to the processing cores 222 by regulating clocks). The management subsystem 208 is an "always-on" power domain. However, the management processor 270 can turn off the clocks to the management processor 270 and/or its private and/or shared peripherals to reduce the dynamic power. Another responsibility of the management processor 270 is varying synchronized clocks of the node CPU subsystem 202 (e.g., of the node CPU 210 and the SCU 212). Another responsibility of the management processor 270 is providing baseboard management control (BMC) and IPMI functionalities including console virtualization. Another responsibility of the management processor 270 is providing router management. Another responsibility of the management processor 270 is acting as proxy for the processing cores 222 for interrupts and/or for network traffic. For example, the GIC 220 of the node CPU subsystem 202 will cause interrupts intended to be received by a particular one of the processing core 222 to be reflected to the management processor 270 for allowing the management processor 270 to wake the particular one of the processing cores 222 when an interrupt needs to be processed by the particular one of the of the processing cores that is sleeping, as will be discussed below in greater detail. Another responsibility of the management processor 270 is controlling phased lock loops (PLLs). A frequency is set in the PLL and it is monitored for lock. Once lock is achieved the output is enabled to the clock control unit (CCU). The CCU is then signalled to enable the function. The management processor 270 is also responsible for selecting the dividers but the actual change over will happen in a single cycle in hardware. Another responsibility of the management processor 270 is controlling a configuration of a variable internal supply used to supply electrical power to the node CPU subsystem 202. For example, a plurality of discrete power supplies (e.g., some being of different power supplying specification than others (e.g., some having different power capacity levels)) can be selectively activated and deactivated as necessary for meeting power requirements of the node CPU subsystem 202 (e.g., based on power demands of the processing cores 222, the SCU 216, and/or the controller of the L2 cache 214). A separate power control mechanism (e.g., switch) can be used to control power supply to each of the processing cores 222 and separately to the SCU 216. Another responsibility of the management processor 270 is managing a real-time-clock (RTC) that exists on a shared peripheral bus of the management subsystem 208. Another responsibility of the management processor 270 is managing a watchdog timer on a private peripheral bus of the management subsystem 208 to aid in recovery from catastrophic software failures. Still another responsibility of the management processor 270 is managing an off-board EEPROM that is accessible via the I2C 292 on the private peripheral bus of the management subsystem 208. The off-board EEPROM is device is used to store all or a portion of boot and node configuration information as well as all or a portion of IPMI statistics that require non-volatile storage. Each of these responsibilities of the management processor 270 is an operational functionality managed by the management processor 270. Accordingly, operational management functionality of each one of the subsystem refers to two or more of these responsibilities being managed by the management processor 270.

As shown in FIG. 14, software 300 is provided on the management processor 270. The management processor 270 includes a plurality of application tasks 302, an operating system (OS)/input-output (I/O) abstraction layer 304, a real-time operating system (RTOS) 306, and device drivers 308 for the various devices. The operating system (OS)/input-output (I/O) abstraction layer 304 is a software layer that resides between the application tasks 302 and the real-time operating system (RTOS) 306. The operating system (OS)/input-output (I/O) abstraction layer 304 aids in porting acquired software into this environment. The OS abstraction portion of the operating system (OS)/input-output (I/O) abstraction layer 304 provides posix-like message queues, semaphores and mutexes. The device abstraction portion of the operating system (OS)/input-output (I/O) abstraction layer 304 provides a device-transparent open/close/read/write interface much like the posix equivalent for those devices used by ported software. The real-time operating system (RTOS) 306 resides between the operating system (OS)/input-output (I/O) abstraction layer 304 and the device drivers 308.

The application tasks 302 include, but are not limited to, a boot task 310, a system management task 312, a power management task 314, a serial concentrator task 316, a frame switch management task 318 (sometimes called routing management), and a network proxy task 320. The boot task 310 provides the function of booting the processing cores 222 and the management processor 270. The system management task 312 provides the function of integrated operation of the various subsystems of the SOC 200. The power management task 314 provides the function of managing power utilization of the various subsystems of the SOC 200. The serial concentrator task 316 provide the function of managing communication from the other application tasks to a system console. This console may be directly connected to the SOC node via a UART (i.e., a universal asynchronous receiver/transmitter) or it can be connected to another node in the system. The frame switch management task 318 (sometimes called routing management) is responsible for configuring and managing routing network functionality. As discussed in greater detail below, the network proxy task 320 maintains network presence of one or more of the processing cores 222 while in a low-power sleep/hibernation state and to intelligently wake one or more of the processing cores 222 when further processing is required.

Device drivers 308 are provided for all of the devices that are controlled by the management processor 270. Examples of the device drivers 308 include, but are not limited to, an I2C driver 322, a SMI driver 324, a flash driver 326 (e.g., NAND type storage media), a UART driver 328, a watchdog time (i.e., WDT) driver 330, a general purpose input-output (i.e., GPIO) driver 332, an Ethernet driver 334, and an IPC driver 336. In many cases, these drivers are implemented as simple function calls. In some cases where needed for software portability, however, a device-transparent open/close/read/write type I/O abstraction is provided on top of these functions.

In regard to boot processes, it is well known that multiple-stage boot loaders are often used, during which several programs of increasing complexity sequentially load one after the other in a process of chain loading. Advantageously, however, the node CPU 210 only runs one boot loader before loading the operating system. The ability for the node CPU 210 to only run one boot loader before loading the operating system is accomplished via the management processor 270 preloading a boot loader image into main memory (e.g., DRAM) of the node CPU subsystem before releasing the node CPU 210 from a reset state. More specifically, the SOC 200 can be configured to use a unique boot process, which includes the management processor 270 loading a suitable OS boot loader (e.g., U-Boot) into main memory, starting the node CPU 210 main OS boot loader (e.g., UEFI or U-Boot), and then loading the OS. This eliminates the need for a boot ROM for the node CPU, a first stage boot loader for the node CPU, and dedicated SRAM for boot of the node CPU.

Present now is a discussion relating to network proxy functionality implemented using the management processor 270. The underlying principle of network proxy functionality is maintaining network presence of each one of the processing cores 222 while one or more of the processing cores 222 is in a low-power sleep/hibernation state and to intelligently wake the one or more sleeping processing cores 222 when further processing associated with the one or more sleeping processing cores 222 is required. More specifically, the network proxy task 320 monitors network events of each processing cores 222 and, when all or a particular one of the processing cores 222 is in dormant or shutdown state, the network proxy function enables the management processor 270 to act as proxy for the processing core(s) 222 that it can reasonably do this for and causes the management processor 270 to wake up the processing core(s) 222 when the management processor 270 receives a network event that it is unable proxy for.

There are several architectural features related to the network proxy functionality. A CSR (i.e., a certified signing request) is implemented to allow the remapping of Port IDs (i.e., portRemap function). For example, when a switch of the SOC 200 is to deliver a packet to the MAC0 port 272 (shown in FIG. 12), this port remapping CSR allows software to remap MAC0 port 272 to the management processor 270 and have the packet delivered to the management processor 270 for network proxy processing. This remapping CSR can also be used to remap traffic destined for the MAC1 port 274 (shown in FIG. 12) to MAC0 port 272. This CSR port remap function is a key SOC feature that facilitates the management processor implementation of network proxy functionality within a SOC node.

As an example, a typical use sequence for implementing network proxy functionality in accordance with an embodiment of the present invention begins with the management processor 270 maintaining the IP to MAC address mappings for the MAC0 port 272 and the MAC1 port 274. This can be done via either explicit communication of these mappings from an instantiation of the operating system running on the node CPU 210 to the management processor 270 or can be done implicitly by having the management processor 270 snoop local gratuitous ARP broadcasts. The node CPU 210 coordinates with the management processor 270 for causing one or more of the processing cores 222 to go to a low power dormant state. During this transition, the management processor 270 sets up the Port ID remapping CSR to route MAC0 port 272 and MAC1 port 274 traffic to the management processor 270. Thereafter, the management processor 270 processes any incoming packets that are transmitted for reception by the MAC0 port 272 or MAC1 port 274. The management processor can implement various categories of packet processing. A first category of packet processing includes responding to some classes of transactions (e.g. an address resolution protocol (ARP) response). A second category of packet processing includes dumping and ignoring some classes of packets. A third category of packet processing includes deciding that one or more of the processing cores 222 that is sleeping must be woken to process some classes of packets. To this end, the management processor 270 will wake one or more of the processing cores 222 that is/are sleeping, undo the Port ID remapping register, and re-send the packets (e.g., through a switch where they were initially received) so that the packets are rerouted back to MAC port that they were originally destined (e.g., MAC0 port 272 or MAC port1 274).

Using the network proxy functionality, the management processor 270 can support Wake-On-LAN (WOL) packets. To this end, the management processor 270 will acquire the WOL packets, which hare broadcast as opposed to being transmitted for reception by a specific recipient. The management processor 270 will know the MAC addresses for the other MACs on the node and, as necessary/appropriate, will be able to wake up the processing cores 222.

Turning now to a discussion of power management functionality, there are preferably multiple power domains in the SOC 200. These power domains are implemented with level shifters, clamps, and switches. Examples of these power domains include, but are not limited to, a plurality of power domains within the node CPU subsystem 202 that can each be transitioned between two or more power states, a plurality of power domains within the peripheral subsystem 204 having that can each be transitioned between two or more power states, a plurality of power domains within the system interconnect subsystem 206 having that can each be transitioned between two or more power states, and a single always-on power domain consisting of the management subsystem 208. The node CPU subsystem 202 can be configured to include 11 power domains (e.g., four processing core power domains, four media processing engine power domains, a SCU power domain, a Debug PTM power domain and a L1 BIST (i.e., built-in self trust) power domain. The peripheral CPU subsystem 204 can be configured to include 2 power domains (e.g., a first power domain for PCIe, SATA, eMMC, NAND controller, and DDR controller) and a second power domain for DDR Phy). The system interconnect subsystem 206 can be configured to include a first power domain for shared logic and a first plurality of XAUI links and a second power domain for a second plurality of XAUI links and outside MAC port. In this regard, power domains of the SOC 200 can be defined by and/or within the processing cores, the SCU, the peripheral interfaces and/or controllers, various storage media, the management processor, XAUI phys, and the switch fabric. Furthermore, a debug subsystem of the SOC 200 can be an additional power domain.

The management subsystem 208 (e.g., via the PMU 281) controls the reset and power for the various power domains of the SOC. As mentioned above, the management subsystem 208 is an "always-on" power domain and the power domains of the remaining subsystems can be selectively transitioned between two or more power states (e.g., through the use of registers which are written by the management processor 270). To this end, each power domain generally has three signals that can be controlled by registers in a respective SOC subsystem.

Each of those domains can logically be in one of a few states, although not all states exist in each domain. A run state can be implement at one of a number of voltage points and hence frequencies. A WFI state, which is also known as a clock gated or waiting for interrupt state, is a state where the clocks are gated off but the logic remains in a state where it can resume quickly. A dormant state is when a domain is powered down but another state is stored (e.g., by software) previous to removing power. An off state is when all power to a domain is removed.

States down to dormant are controlled primarily by the WFI and power_status registers of the node CPU 210 and/or operations of the IPC 280 operations from the software to the management processor 270 modifying the processing core power state and clock frequency. States below dormant are controlled by operations being sent to the management processor 270 either based on software ahead of time (i.e. before the state is entered) or on system loading. Software will inform the management processor 270 before it enters a low power state (below dormant) that the target state is. The power down state is reached only when all of the power sources are removed from the system.

There are several states which can exist in the SOC overall. These are combinations of the different subsystem states described above. Table 1 below provides examples of various overall states of the SOC.

TABLE 1

Overall SOC Power Domain States

| State | Cores | SCU | Peripherals | Switch | DDR | SRAM | M3 |
|---|---|---|---|---|---|---|---|
| RUN | ON[a] | ON | ON | ON | ON[b] | ON | ON |
| RUN slow | ON[a] Lower voltage | | | | | | |
| WFI | Clock gated | | | | | | |
| Dormant | Dormant | | | | | | |
| S1 | | Dormant | Clock gated | | Self refresh | retention | |
| S3 | Off | Off | OFF | Off | | | |
| OFF | | | | | OFF | Off | Clock gated OFF |
| Full power off | | | | | | | |
| Power down | | | All batteries drained | | | | |

[a]Some cores may be in WFI state or dormant state
[b]DDR can enter auto power down or pre-charge power down states There are several power states supported in the node CPU 210. Each one of the processing cores 222 can be in a number of states independent from the others. Furthermore, if the processing cores 222 are all in a low power state then the L2 cache 216 and SCU 214 can potentially transition to dormant and off low power states. The processing cores to power down their L1 caches until we are moving the entire subsystem into a low power state (which implies that the ACP port and debug is also not in use). Table 2 below provides examples of various power states supported in the node CPU 210.

TABLE 2 node CPU Power States

| State | SCU & L2 | Core 0 | Core 1 | Core 2 | Core 3 |
|---|---|---|---|---|---|
| RUN | ON | ON | ON | ON | ON |
| RUN slow | | ON slow | ON slow | ON slow | ON slow |
| WFI | | WFI | WFI | WFI | WFI |
| Dormant | | Dormant | Dormant | Dormant | Dormant |
| S1 | Dormant | | Dormant | | |
| S3 or below | | | OFF | | |

When a processing core is in the ON state, it is powered up and running at some run frequency. When a core is in the ON slow state at least one of the cores is running, but all of those that are running are running at a lower than normal voltage and frequency point. The SCU and L2 are also running at this lower frequency point. Functionally, the ON slow state is the same as the ON state. Control of the ON state and the ON slow state is implemented by the management processor 270. For example, the IPC 280 sends an operation to the management processor 270 indicating that the processing cores 222 can afford to run slower than normal and hence voltage and clock frequency can be sequenced lower asynchronously to software, similarly an increase frequency event can also be sent. Frequency changes will have implications for the periphclock within the node CPU. Normally this clock is synchronous and a fixed divide of the coreclock but in order to maintain correct timing periods, the core periphclock ratio will change as frequency of the core changes.

In addition to the power domains described in the previous section, the node CPU subsystem 202 can also be voltage and frequency scaled. A single voltage and frequency scaling apply across the entire node CPU subsystem 202. In this respect, individual functional blocks and/or subsystem elements cannot be individually set (e.g., on a per-core basis). In regard to the node CPU subsystem 202, the subsystem elements that get uniformly voltage and frequency scaled include processing cores 222, the L1 caches 224, 226, the media processing engine of each one of the processing cores 222, the SCU 216, and the L2 controller 216. Control for voltage scaling can be implemented via an interface to an external PMIC. Control for frequency scaling can be implemented via PLL control.

Continuing the discussion of power management functionality that can be provided within the SOC 200, power management of silicon-based components of the SOC 200 (e.g., processors, controllers, storage media, etc) is of particular interest with respect to techniques for accomplishing power management. Maximum performance of silicon-based components is achieved by high clock frequency at high voltage and reduced power consumption is provided by reducing clock frequency. As the voltage is lowered, the transistors of such silicon-based components become weaker and the frequency of operation decreases.

Total power consumption of silicon-based components is the sum of dynamic power consumption and leakage power consumption. Leakage power consumption refers to power burned by transistors when they are not switching and dynamic power consumption refers to power consumption directly related to switching operations. The leakage power consumption is highly dependent on temperature and voltage of the component and it is common for leakage power consumption to equal or exceed dynamic power consumption. Because power consumption of silicon-based components is a function of the clock frequency and the square of operating voltage, a change in voltage will typically have a much more pronounced effect on power consumption than will a change in clock frequency. For example, a 27% reduction in operating voltage for a given clock frequency corresponds to 47% less power whereas a 27% reduction in clock frequency corresponds to a 27% reduction in power for a given operating voltage. Accordingly, useful power reduction techniques in regard to leakage power consumption can include turning power off, reducing voltage, reducing temperature through use of heat sinks, fans, packaging, etc whereas useful power reduction techniques in regard to dynamic power consumption can include lower clock frequencies, turning off clocks, and reducing operating voltage.

As mentioned above, the management subsystem 208 is an "always-on" domain. The PMU can, however, turn off clocks to the management processor 270 and/or its peripherals (e.g., Private and/or Shared) to reduce dynamic power consumption. The management processor 270 is typically in WFI (wait-for-interrupt) state. In this state, the clock of the management subsystem 208 is gated to the management processor 270 but still clocks the interrupt controller of the management processor 270 (e.g., the nested vectored interrupt controller (NVIC)). When the NVIC receives an interrupt, it will cause the clocks to the management processor 270 to be turned back on and the node core 210 will service the interrupt.

Implementing power management within the node CPU 210 can include the PMU 281 selectively controlling voltage and frequency levels at which components of the node CPU 210 operate. All of the processing cores 222 are clocked by same frequency and operate at nominally the same voltage (e.g., powered by a common power supply), but the PMU can change this frequency and/or the voltage for altering power consumption. Furthermore, the alter leakage power consumption, the PMU 281 can gate the power supply of each one of the processing cores 222 and/or gate clocks to powered off domains for altering power consumption. The operating system controls which one(s) of the processing cores 222 are being used and whether the unused ones of the processing cores 222 are in WFI/WFE or shutdown mode (e.g., via writes to power status register of the SCU 212 and execution of WFI/WFE information). Table 3 below shows various power modes for the node CPU 210.

TABLE 3

Node CPU Power Modes

| Mode | Clocks | Power | Comments |
|---|---|---|---|
| Run Mode | On | On | Running code |
| WFI/WFE Mode | Off (except wakeup logic) | On | Waiting on interrupt to turn clocks back on |
| Dormant Mode* | Off | Core power off | L1 RAMs retain state* |
| | | RAM power on (retention) | External wakeup event, M3 reset's the A9 processor |
| Shutdown Mode | Off | Everything Off | No state retention unless it was moved to DRAM. External wakeup event, M3 reset's the A9 processor |

The media processing engine of each one of the processing cores 222 occupies a significant amount of die space. As such, it has a fair amount of leakage current that translates to a corresponding amount of leakage power consumption. Advantageously, the SOC 200 can be implemented in a manner whereby a scalar floating point (FPU) is provided in the node CPU power domain and whereby the media processing engine associated with one of the processing cores 222 is in a separate power domain. In a static power management strategy for the media processing engines, an XML configuration associated with the node will have an entry that indicates whether a media processing engine is to be powered on or off during boot configuration. In a settable power management strategy for the media processing engines, an API would be exposed on both on the node CPU 210 and via an IPMI interface on the management processor 270 to allow the media processing engine associated with one of the processing cores 222 to be selectively powered up or down. If the power state condition is set on the management processor 270, this setting could be persisted and made the default for a subsequent boot instance. In a dynamic power management strategy for the media processing engines, the media processing engines are powered up only when instruction types associated with the media processing engines are needed. To this end, the strategy would start with the media processing engines powered off and isolated. When a media processing engine instruction is executed, software of the management subsystem 208 and/or node CPU subsystem 202 will trap with an unimplemented instruction and a suitable handler software can perform the appropriate power-up sequence of media processing engine(s), thereby allowing the media processing engine instruction to be executed.

The peripheral subsystem 204 can include one or more power domains that are controlled by the PMU 281. These peripherals include controller (i.e., interfaces) for PCIe, SATA, NAND, eMMC, and DDR storage media. In one implementation, they are all within a common power domain that has a single reset, isolate, and power-up signalling structure. In another implementation, these controllers can reside in one of a plurality of different power domains. For example, it may be beneficial to have the DDR controller in a separate domain than the other peripheral controllers for allowing the DDR to be selectively accessed by the management processor 270 while other peripherals are in a powered down state. It is disclosed herein that the PMU 281 can also include a PCI power management module can also provide for PCI compatible active state power management. The PCI power management module is powered up while the node CPU 210 is in a lower power state and contains context that is reset only at power up and can contain sideband wake mechanism for the SOC node.

The system interconnect subsystem 206 can include two or more power domains that are controlled by the PMU 281. In particular, a portion of the system interconnect subsystem 206 that is considered to be the fabric switch can be divided into two power domains. These power domains are partitioned so that power to the fabric switch power can be optimized for leaf nodes that only have 1 or 2 links to reduce leakage power consumption. For example, a first power domain can contain MAC0, MAC1, MAC2, Link1, Link2, the Switch, Switch Arbitration logic, the CSRs, and global control logic and a second power domain can contain Outlink/Link0, Link3, and Link4. In this example, there would be three power states: first and second power domains are both off, the first power domain is on and the second power domain is off, and both power domains are on.

In certain implementation of power domains within the system interconnect subsystem 206, the fabric switch is configured such that each power domain has an enable bit in a register. When a particular power domain is reset, this enable bit is cleared thereby disabling functionality of the particular power domain. This enable bit is effectively a synchronous reset to all the logic in the particular power domain. In view of this enable bit functionality, only one reset is needed for the entire fabric switch and each one of the power domains will have its own separate isolate and power-up signals.

Turning now to a discussion of interrupts, it should be appreciated and understood that most of the on-chip peripherals generate interrupts. With few exceptions, these interrupts are routed to both the node CPU subsystem 202 and the management subsystem 208. The exceptions to this exist for those peripherals that are private to the management processor 270 and those that are private to the node CPU 210. These interrupts can be acted on in a manner that supports or enables power management functionality (e.g., network proxy functionality) and that support power utilization functionality (e.g., interrupts acquired by the management processor 270 and used for reporting on node CPU utilization).

The node CPU 210 can have a hierarchical interrupt scheme in which external interrupts of the node CPU 210 are sent first to an interrupt distributor that resides, for example, in the SCU 212. The interrupts can be routed to any or all of the interrupt controllers of the node CPU 210 (e.g., interrupt controller of any one of the processing cores 222). Under software control, the interrupt distributor controls a list of processing cores to which each interrupt is routed. Each of the quad cores' interrupt controllers allows masking of the interrupt source locally as well.

Interrupts are in general visible to both the node CPU 210 and the management processor 270. It is then the responsibility of the management processor to unmask the interrupts it wants to see. If the whole CPU subsystem 202 is powered down (e.g., hibernated) then the management processor 270 will unmask important interrupts of the node CPU 210 to see events that would cause the node CPU 210 to be woken. It is the responsibility of the management processor 270 to either service the interrupt or re-power the OS on the node CPU subsystem 202 so it can service it. Similarly, if a processing core for which the interrupt is intended is in WFI (wait-for-interrupt) mode or WFE (wait-for-exception) mode, the management processor 270 can unmask the interrupt to one of the other processing cores that is already powered up thereby allowing the already powered up processing cores to service the interrupt. This is an example of subsystem masking an interrupt and allowing another the subsystem to service it, which is a form of network proxy functionality discussed above.

Interrupts on the node CPU 210 can also be used for implementing various power modes within power domains of the node CPU subsystem 202. More specifically, the OS running on the node CPU 210 can distribute the processing load among each one of the processing cores 222. In times when peak performance is not necessary, the OS can lower the power consumption within the node CPU 210 by clock-gating or powering down individual cores. As long as at least one of the processing cores 222 is running, the OS requires no intervention from the management processor 270 (e.g., the PMU thereof) for handling interrupts. A particular one of the processing cores 222 can be stopped in WFI/WFE state which causes the clock to be gated most of that particular processing core, except for its interrupt controller. If an interrupt occurs for that particular processing core, the clock of that particular processing core can be turned back on for allowing that particular core to service the interrupt. Alternatively, as discussed above, if an individual core is powered off, the OS of the node CPU 210 can route an interrupt for that core to another one of the processing cores 222 that is already powered up. If the whole node CPU 210 is powered down, interrupts will be steered to the management processor 270 where the event will be seen and it will then be the responsibility of the management processor 270 to either service the interrupt or reboot the OS on the node CPU 210 so that one of the processing cores 222 can service the interrupt.

In summary, in view of the disclosures made herein a skilled person will appreciate that a system on a chip (SOC) refers to integration of one or more processors, one or more memory controllers, and one or more I/O controllers onto a single silicone chip. Furthermore, in view of the disclosures made herein, the skilled person will also appreciate that a SOC configured in accordance with the present invention can be specifically implemented in a manner to provide functionalities definitive of a server. In such implementations, a SOC in accordance with the present invention can be referred to as a server on a chip. In view of the disclosures made herein, the skilled person will appreciate that a server on a chip configured in accordance with the present invention can include a server memory subsystem, a server I/O controllers, and a server node interconnect. In one specific embodiment, this server on a chip will include a multi-core CPU, one or more memory controllers that supports ECC, and one or more volume server I/O controllers that minimally includes Ethernet and SATA controllers. The server on a chip can be structured as a plurality of interconnected subsystems, including a CPU subsystem, a peripherals subsystem, a system interconnect subsystem, and a management subsystem.

An exemplary embodiment of a server on a chip that is configured in accordance with the present invention is the ECX-1000 Series server on a chip offered by Calxeda incorporated. The ECX-1000 Series server on a chip includes a SOC architecture that provides reduced power consumption and reduced space requirements. The ECX-1000 Series server on a chip is well suited for computing environments such as, for example, scalable analytics, web-serving, media streaming, infrastructure, cloud computing and cloud storage. A node card configured in accordance with the present invention can include a node card substrate having a plurality of the ECX-1000 Series server on a chip instances (i.e., each a server on a chip unit) mounted on the node card substrate and connected to electrical circuitry of the node card substrate. An electrical connector of the node card enables communication of signals between the node card and one or more other instances of the node card.

The ECX-1000 Series server on a chip includes a CPU subsystem (i.e., a processor complex) that uses a plurality of ARM brand processing cores (e.g., four ARM Cortex brand processing cores), which offer the ability to seamlessly turn on-and-off up to several times per second. The CPU subsystem is implemented with server-class workloads in mind and comes with a ECC L2 cache to enhance performance and reduce energy consumption by reducing cache misses. Complementing the ARM brand processing cores is a host of high-performance server-class I/O controllers via standard interfaces such as SATA and PCI Express interfaces.

Table 4 below shows technical specification for a specific example of the ECX-1000 Series server on a chip.

TABLE 4

Example of ECX-1000 Series server on a chip technical specification

| | |
|---|---|
| Processor Cores | 1. Up to four ARM ® Cortex ™-A9 cores @ 1.1 to 1.4 GHz |
| | 2. NEON ® technology extensions for multimedia and SIMD processing |
| | 3. Integrated FPU for floating point acceleration |
| | 4. Calxeda brand TrustZone ® technology for enhanced security |
| | 5. Individual power domains per core to minimize overall power consumption |
| Cache | 1. 32 KB L1 instruction cache per core |
| | 2. 32 KB L1 data cache per core |
| | 3. 4 MB shared L2 cache with ECC |
| Fabric Switch | 1. Integrated 80 Gb (8 × 8) crossbar switch with through-traffic support |
| | 2. Five (5) 10 Gb external channels, three (3) 10 Gb internal channels |
| | 3. Configurable topology capable of connecting up to 4096 nodes |

TABLE 4-continued

Example of ECX-1000 Series server on a chip technical specification

| | |
|---|---|
| | 4. Dynamic Link Speed Control from 1 Gb to 10 Gb to minimize power and maximize performance |
| | 5. Network Proxy Support to maintain network presence even with node powered off |
| Management Engine | 1. Separate embedded processor dedicated for systems management |
| | 2. Advanced power management with dynamic power capping |
| | 3. Dedicated Ethernet MAC for out-of-band communication |
| | 4. Supports IPMI 2.0 and DCMI management protocols |
| | 5. Remote console support via Serial-over-LAN (SoL) |
| Integrated Memory Controller | 1. 72-bit DDR controller with ECC support |
| | 2. 32-bit physical memory addressing |
| | 3. Supports DDR3 (1.5 V) and DDR3L (1.35 V) at 800/1066/1333 MT/s |
| | 4. Single and dual rank support with mirroring |
| PCI Express | 1. Four (4) integrated Gen2 PCIe controllers |
| | 2. One (1) integrated Gen1 PCIe controller |
| | 3. Support for up to two (2) PCIe x8 lanes |
| | 4. Support for up to four (4) PCIe x1, x2, or x4 lanes |
| Networking Interfaces | 1. Support 1 Gb and 10 Gb Ethernet |
| | 2. Up to five (5) XAUI 10 Gb ports |
| | 3. Up to six (6) 1 Gb SGMII ports (multiplexed w/XAUI ports) |
| | 4. Three (3) 10 Gb Ethernet MACs supporting IEEE 802.1Q VLANs, IPv4/6 checksum processing, and TCP/UDP/ICMP checksum offload |
| | 5. Support for shared or private management LAN |
| SATA Controllers | 1. Support for up to five (5) SATA disks |
| | 2. Compliant with Serial ATA 2.0, AHCI Revision 1.3, and eSATA specifications |
| | 3. SATA 1.5 Gb/s and 3.0 Gb/s speeds supported |
| SD/eMMC Controller | 1. Compliant with SD 3.0 Host and MMC 4.4 (eMMC) specifications |
| | 2 Supports 1 and 4-bit SD modes and 1/4/8-bit MMC modes |
| | 3. Read/write rates up to 832 Mbps for MMC and up to 416 Mbps for SD |
| System Integration Features | 1. Three (3) I2C interfaces |
| | 2 Two (2) SPI (master) interface |
| | 3. Two (2) high-speed UART interfaces |
| | 4. 64 GPIO/Interrupt pins |
| | 5. JTAG debug port |

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A server on a chip (SoC), comprising:
a node central processing unit (CPU) subsystem that includes a plurality of processing cores;
a peripheral subsystem that includes a plurality of peripheral controllers;
a system interconnect subsystem configured to provide packet switch functionality within the SoC and between the SoC and at least one other SoC that is connected to the SoC; and
a management subsystem coupled to the node CPU subsystem, the peripheral subsystem, and the system interconnect subsystem, wherein the management subsystem includes a management processor that is configured to run an operating system to manage operational functionality of the node CPU subsystem, the peripheral subsystem, and the system interconnect subsystem, wherein the operating system run by the management processor includes a plurality of application tasks, an operating system (OS)/input-output (I/O) abstraction layer, a real-time operating system (RTOS), and a plurality of device drivers, wherein the plurality of application tasks includes boot task, system management task, power management task, serial concentrator task, frame switch management task, and network proxy task.

2. The SoC of claim 1, wherein:
the node CPU subsystem includes a plurality of node CPU subsystem power domains,
the peripheral subsystem includes a plurality of peripheral subsystem power domains,
the system interconnect subsystem includes a plurality of system interconnect subsystem power domains; and
the management processor is configured to manage one or more activities within each of the node CPU subsystem power domains, the peripheral subsystem power domains, and the system interconnect subsystem power domains that influence power consumption therein.

3. The SoC of claim 2, wherein:
the management processor is configured to cause each of the node CPU subsystem power domains, the peripheral subsystem power domains, and the system interconnect subsystem power domains to be selectively transitioned between at least two different power states; and
wherein functionality of at least one operational component of one of the subsystems associated with a respective power domain is configured to transition to a reduced power consumption state in response to the respective power domain being transitioned from a first power state to a second power state.

4. The SoC of claim 3, wherein:
the plurality of processing cores are within separate node CPU subsystem power domains;
at least two of the plurality of peripheral controllers are within separate peripheral subsystem power domains;
at least two XAUI links of the system interconnect subsystem are within separate system interconnect subsystem power domains.

5. The SoC of claim 1, wherein the management subsystem is configured to:
manage power consumption on a per-power domain basis;
act as proxy for the plurality of processing cores for interrupts intended for reception by the plurality of processing cores; and
control a configuration of a variable internal supply used to supply electrical power to the node CPU subsystem.

6. The SoC of claim 1, wherein the management subsystem is configured to:
selectively transition a first clock to the management processor between a first on-state and a first off-state;
selectively transition a second clock to one or more private peripherals of the management processor between a second on-state and a second off-state; and
selectively transition a third clock to one or more shared peripherals of the management processor between a third on-state and a third off-state.

7. The SoC of claim 6, wherein the management subsystem is configured to:
manage power consumption of a per-power domain basis;
act as proxy for the plurality of processing cores for interrupts intended for reception by the plurality of processing cores; and
control a configuration of a variable internal supply used to supply electrical power to the node CPU subsystem.

8. The SoC of claim 1, wherein:
the node CPU subsystem includes a cache memory, a main memory, and a main memory controller coupled between the cache memory and the main memory;
the cache memory is coupled to each of the plurality of processing cores thereby enabling the cache memory to be shared by all of the plurality of processing cores;
the main memory controller is configured to support error code correction (ECC) functionality; and
the peripheral subsystem includes one or more Ethernet controllers and one or more serial advanced technology attachment (SATA) controllers.

9. The SoC of claim 8, wherein the peripheral subsystem further includes:
one or more flash controllers; and
one or more peripheral component interconnect express (PCIe) controllers.

10. The SoC of claim 8, wherein:
the node CPU subsystem includes a plurality of node CPU subsystem power domains,
the peripheral subsystem includes a plurality of peripheral subsystem power domain,
the system interconnect subsystem includes a plurality of system interconnect subsystem power domains; and
the management processor is configured to manage one or more activities within each of the node CPU subsystem power domain, the peripheral subsystem power domain, and the system interconnect subsystem power domains that influence power consumption therein.

11. The SoC of claim 10, wherein:
the management processor is configured to cause each of the node CPU subsystem power domains, the peripheral system power domains, and the system interconnect subsystem power domains to be selectively transitioned between at least two different power states; and
wherein functionality of at least one operational component of one of the subsystems associated with a respective power domain is transitioned to a reduced power consumption state in response to the respective power domain being transitioned from a first power state to a second power state.

12. The SoC of claim 8, wherein the management subsystem is configured to:
manage power consumption on a per-power domain basis;
act as proxy for the plurality of processing cores for interrupts intended for reception by the plurality of processing cores; and
control a configuration of a variable internal supply used to supply electrical power to the node CPU subsystem.

13. A node card, comprising:
a node card substrate that includes circuitry configured to enable communication of information between the node card and one or more other node cards; and
a plurality of server on a chip (SoC) units mounted on the node card substrate and electrically connected to the circuitry of the node card substrate, wherein each of the SoC units defines an instance of a SoC node of the node card, wherein each SoC node includes a SoC that comprises:
a node CPU subsystem,
a peripheral subsystem,
a system interconnect subsystem, and
a management subsystem coupled to the node CPU subsystem, the peripheral subsystem, and the system interconnect subsystem, wherein the management subsystem includes a management processor that is configured to run an operating system to manage operational functionality of the node CPU subsystem, the peripheral subsystem, and the system interconnect subsystem, wherein the operating system run by the management processor includes a plurality of application tasks, an operating system (OS)/input-output (I/O) abstraction layer, a real-time operating system (RTOS), and a plurality of device drivers, wherein the plurality of application tasks includes boot task, system management task, power management task, serial concentrator task, frame switch management task, and network proxy task.

14. The node card of claim 13, wherein:
the node CPU subsystem of each of the SoC units includes a plurality of processing cores, a cache memory, a main memory, and a main memory controller coupled between the cache memory and the main memory;
the cache memory is coupled to each of the plurality of processing cores thereby enabling the cache memory to be shared by all of the plurality of processing cores;
the main memory controller is configured to support error code correction (ECC) functionality;
the peripheral subsystem of each of the SoC units includes a plurality of peripheral controllers; and
the system interconnect subsystem of each of the SoC units is configured to provide intra-node and inter-node packet connectivity.

15. The node card of claim 14, wherein the management subsystem of each of the SoC unit is configured to:
manage power consumption on a per-power domain basis;
act as proxy for the plurality of processing cores for interrupts intended for reception by the plurality of processing cores; and
control a configuration of a variable internal supply used to supply electrical power to the node CPU subsystem.

16. The node card of claim 13, wherein the management processor of each of the SoC units is configured to boot an instance of a second operating system in the node CPU subsystem thereof.

17. The node card of claim 16, wherein:
the management processor is configured to load an operating system boot loader into a main memory of the node CPU subsystem thereof, start the boot loader, and load the second operating system.

18. The node card of claim 13, wherein:
the node CPU subsystem of each of the SoC units includes a plurality of node CPU subsystem power domains,
the peripheral subsystem of each of the SoC units includes a plurality of peripheral subsystem power domains,
the system interconnect subsystem of each of the SoC units includes a plurality of system interconnect subsystem power domains; and
the management processor of each of the SoC units is configured to manage one or more activities within each of the node CPU subsystem power domain, the peripheral subsystem power domains, and the system interconnect subsystem power domains that influence power consumption therein.

19. The SoC of claim 1, wherein the management subsystem is coupled to the node CPU subsystem via an inter-processor communication module (IPCM), and wherein the management subsystem is coupled to the system interconnect subsystem via a bus fabric.

20. The SoC of claim 19, wherein the IPCM includes data registers and interrupts configured to enable communication between the management processor and the plurality of processing cores of the node CPU subsystem.

21. The SoC of claim 1, wherein the management subsystem further includes a shared peripheral and a private peripheral, wherein the shared peripheral is accessible by the management processor and the plurality of processing cores of the node CPU subsystem, and wherein the private peripheral is accessible by the management processor but not the plurality of processing cores of the node CPU subsystem.

22. The SoC of claim 21, wherein the management processor is configured to use the private peripheral to control power and clocks of the SoC.

* * * * *